United States Patent
Watanabe

(10) Patent No.: US 9,113,366 B2
(45) Date of Patent: Aug. 18, 2015

(54) METHOD FOR IDENTIFYING AREA, WIRELESS BASE STATION, MOBILE TERMINAL, AND WIRELESS COMMUNICATION SYSTEM

(75) Inventor: Naotoshi Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 13/593,654

(22) Filed: Aug. 24, 2012

(65) Prior Publication Data

US 2012/0322456 A1 Dec. 20, 2012

Related U.S. Application Data

(63) Continuation of application No. PCT/JP2010/053783, filed on Mar. 8, 2010.

(51) Int. Cl.
*H04W 24/00* (2009.01)
*H04W 24/08* (2009.01)
*H04W 64/00* (2009.01)
*H04W 48/20* (2009.01)

(52) U.S. Cl.
CPC .............. *H04W 24/08* (2013.01); *H04W 48/20* (2013.01); *H04W 64/00* (2013.01)

(58) Field of Classification Search
CPC ... H04M 1/72572; H04W 4/02; H04W 64/00; H04W 76/007; H04W 4/22; H04W 64/003; H04W 4/025; H04W 16/00; H04W 16/18; H04W 48/04
USPC ............ 455/422.1, 423, 67.11, 67.13, 67.16, 455/115.1, 115.3, 226.1, 226.2, 226.3, 455/456.5, 457
See application file for complete search history.

(56) References Cited

U.S. PATENT DOCUMENTS

| | | | | |
|---|---|---|---|---|
| 5,023,900 A | * | 6/1991 | Tayloe et al. | 379/32.01 |
| 6,266,514 B1 | * | 7/2001 | O'Donnell | 455/67.13 |
| 6,757,545 B2 | * | 6/2004 | Nowak et al. | 455/456.2 |
| 7,158,790 B1 | * | 1/2007 | Elliott | 455/446 |
| 8,260,322 B2 | * | 9/2012 | Allen et al. | 455/456.5 |
| 8,639,212 B1 | * | 1/2014 | Sennett et al. | 455/404.2 |
| 2002/0152269 A1 | | 10/2002 | Ichimura | |
| 2003/0228873 A1 | | 12/2003 | Manzen | |
| 2004/0147266 A1 | * | 7/2004 | Hwang et al. | 455/445 |

(Continued)

FOREIGN PATENT DOCUMENTS

| | | |
|---|---|---|
| JP | 5-83189 | 4/1993 |
| JP | 2001-8250 | 1/2001 |

(Continued)

OTHER PUBLICATIONS

Notice of Rejection Ground dated Jun. 18, 2013, from corresponding Japanese Application No. 2012-504178.

(Continued)

*Primary Examiner* — Olumide T Ajibade Akonai
(74) *Attorney, Agent, or Firm* — Katten Muchin Rosenman LLP

(57) ABSTRACT

A method including collecting position information indicating a position of an area to which a wireless communication service is not provided, transmitting the position information from the mobile terminal to a wireless base station using a random access procedure for setting up a communication channel between the wireless base station and the mobile station, and identifying the area which is within a cell range of the wireless base station and to which the wireless communication service is not provided.

10 Claims, 17 Drawing Sheets

(56) References Cited

U.S. PATENT DOCUMENTS

| | | | |
|---|---|---|---|
| 2005/0164685 A1 | 7/2005 | Yoshioka | |
| 2008/0268785 A1* | 10/2008 | McCoy et al. | 455/67.11 |
| 2008/0293355 A1 | 11/2008 | Giloh | |
| 2009/0154404 A1 | 6/2009 | Abeta et al. | |
| 2009/0310501 A1 | 12/2009 | Catovic et al. | |
| 2009/0323607 A1* | 12/2009 | Park et al. | 370/329 |
| 2010/0067498 A1* | 3/2010 | Lee et al. | 370/336 |

FOREIGN PATENT DOCUMENTS

| | | |
|---|---|---|
| JP | 2002-271833 | 9/2002 |
| JP | 2002-314477 | 10/2002 |
| JP | 2004-15630 | 1/2004 |
| JP | 2004-235827 | 8/2004 |
| JP | 2005-210530 | 8/2005 |
| JP | 2008-538672 | 10/2008 |
| JP | 2009-100245 | 5/2009 |
| JP | 2009-267925 | 11/2009 |
| WO | 2007/052752 | 5/2007 |

OTHER PUBLICATIONS

International Search Report dated May 18, 2010, from corresponding International Application No. PCT/JP2010/053783.

3GPP TR 36.902 V1.2.0 3rd Generation Partnership Project; Technical Specification Group Radio Access Network; Evolved Universal Terrestrial Radio Access Network (E-UTRAN); Self-configuring and self-optimizing network use cases and solutions, (Release 9), May 2009.

3GPP TS 36.305 V9.8.0 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN, (Release 9), Sep. 2011.

Notice of Rejection Grounds dated Oct. 29, 2013, from corresponding Japanese Application No. 2012-504178.

Extended European Search Report dated Jul. 2, 2015, from the corresponding EP10847384.4.

* cited by examiner

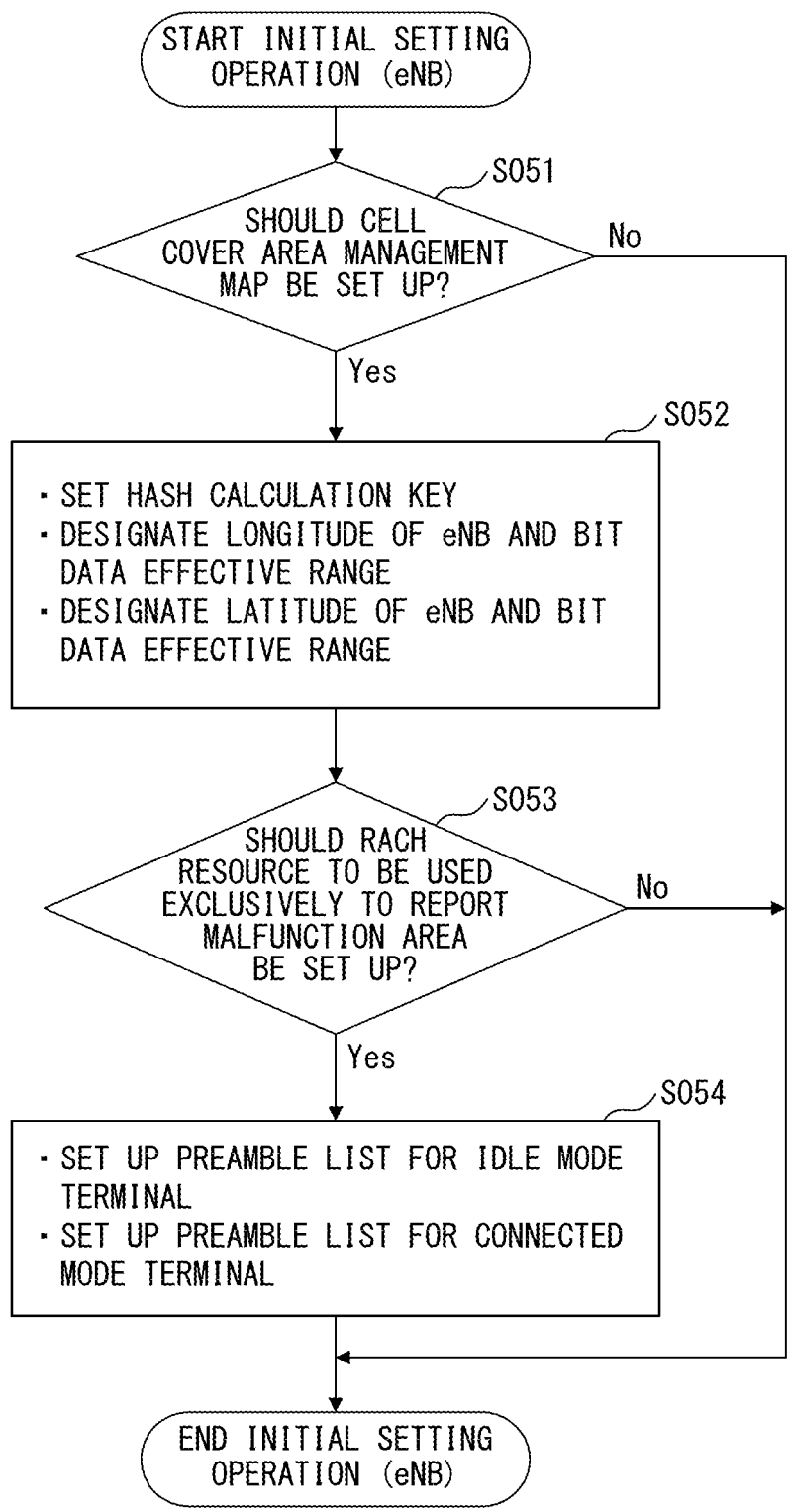
F I G. 6

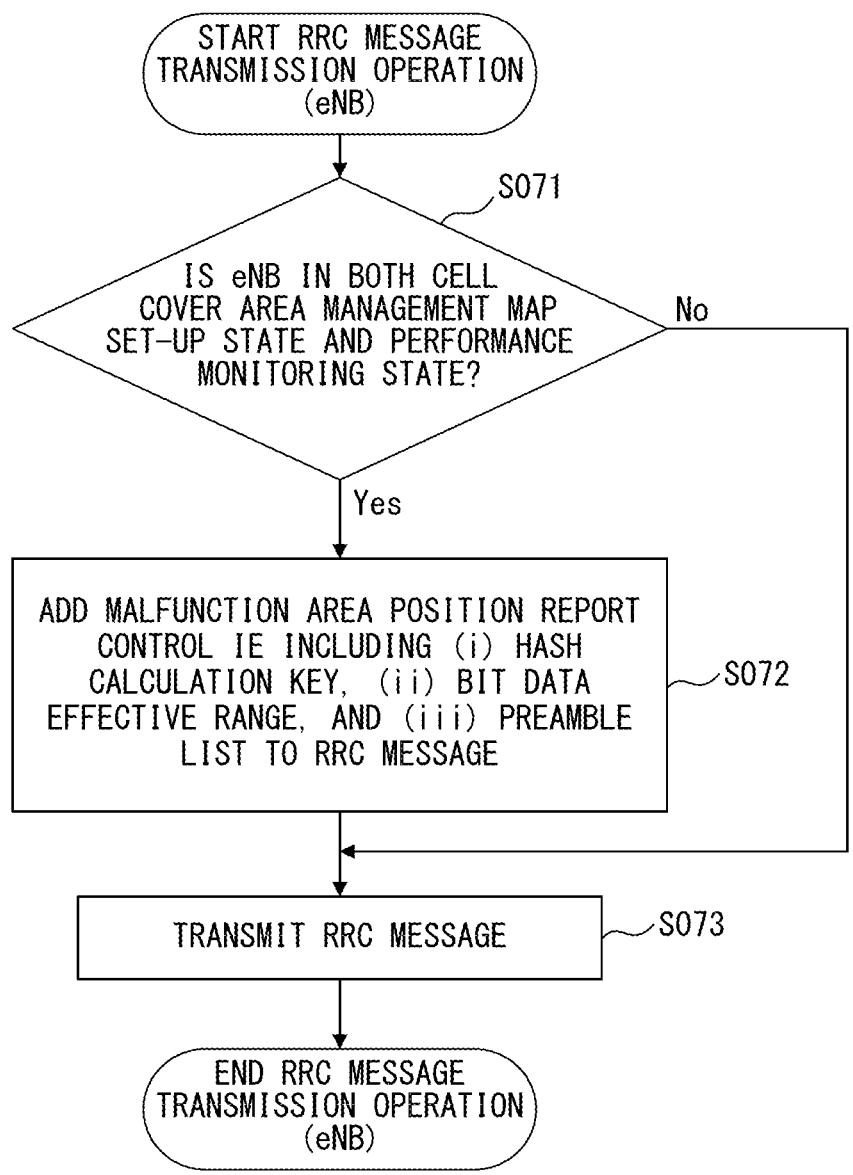
F I G. 7

```
RRC connection reconfiguration MESSAGE rrc-TransactionIdentifier
criticalExtensions        CHOICE{
        c1                CHOICE{
        rrcConnectionReconfiguration-r8
                >measConfig
                >mobilityControlInfo
                ...
        MALFUNCTION AREA POSITION REPORT CONTROL IE{
                HASH CALCULATION KEY;
                BIT DATA EFFECTIVE RANGE;
                RACH PREAMBLE LIST
                }
        spares
        },
        criticalExtensionsFuture
}
```

FIG. 8

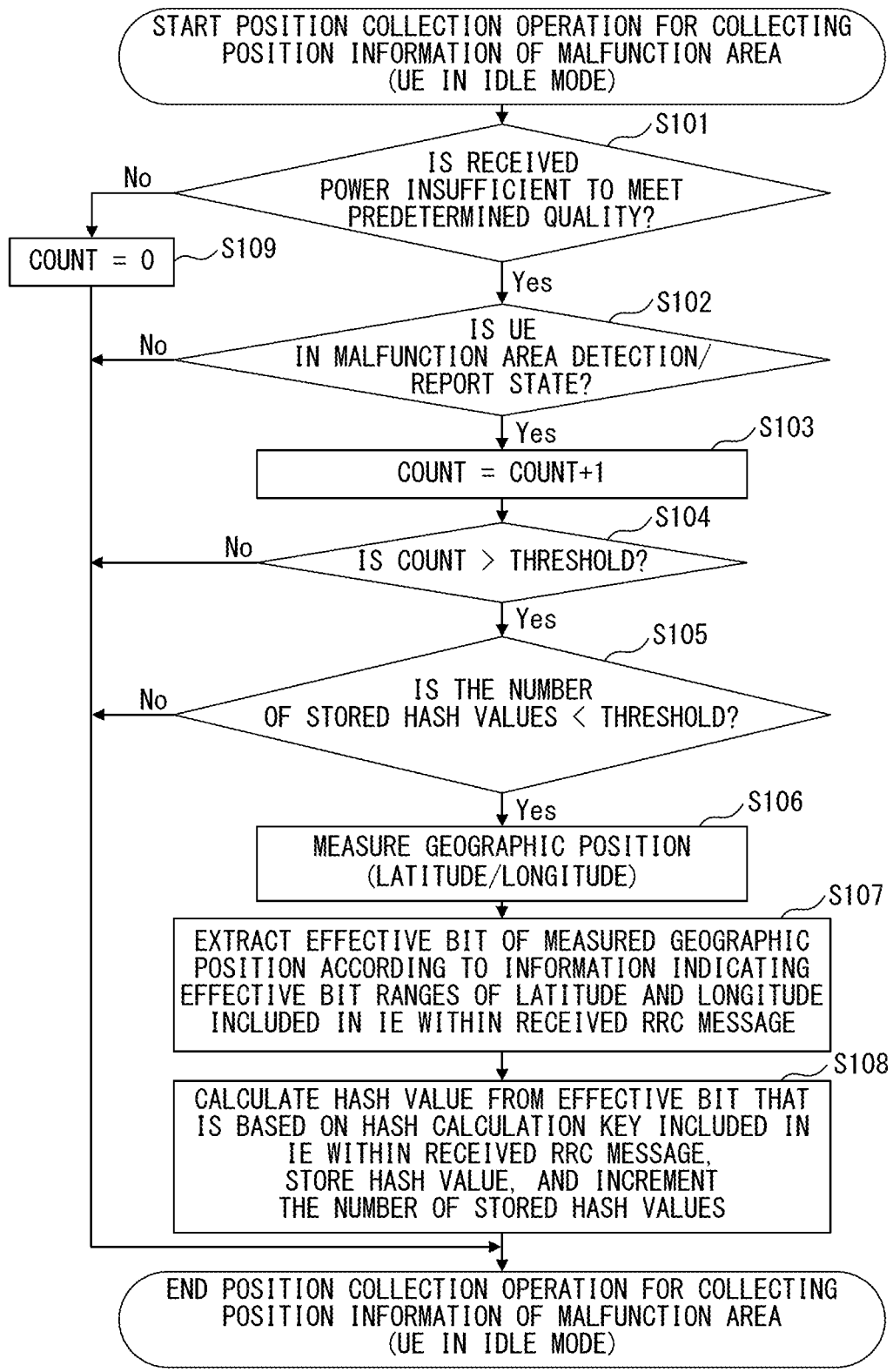
F I G. 1 0

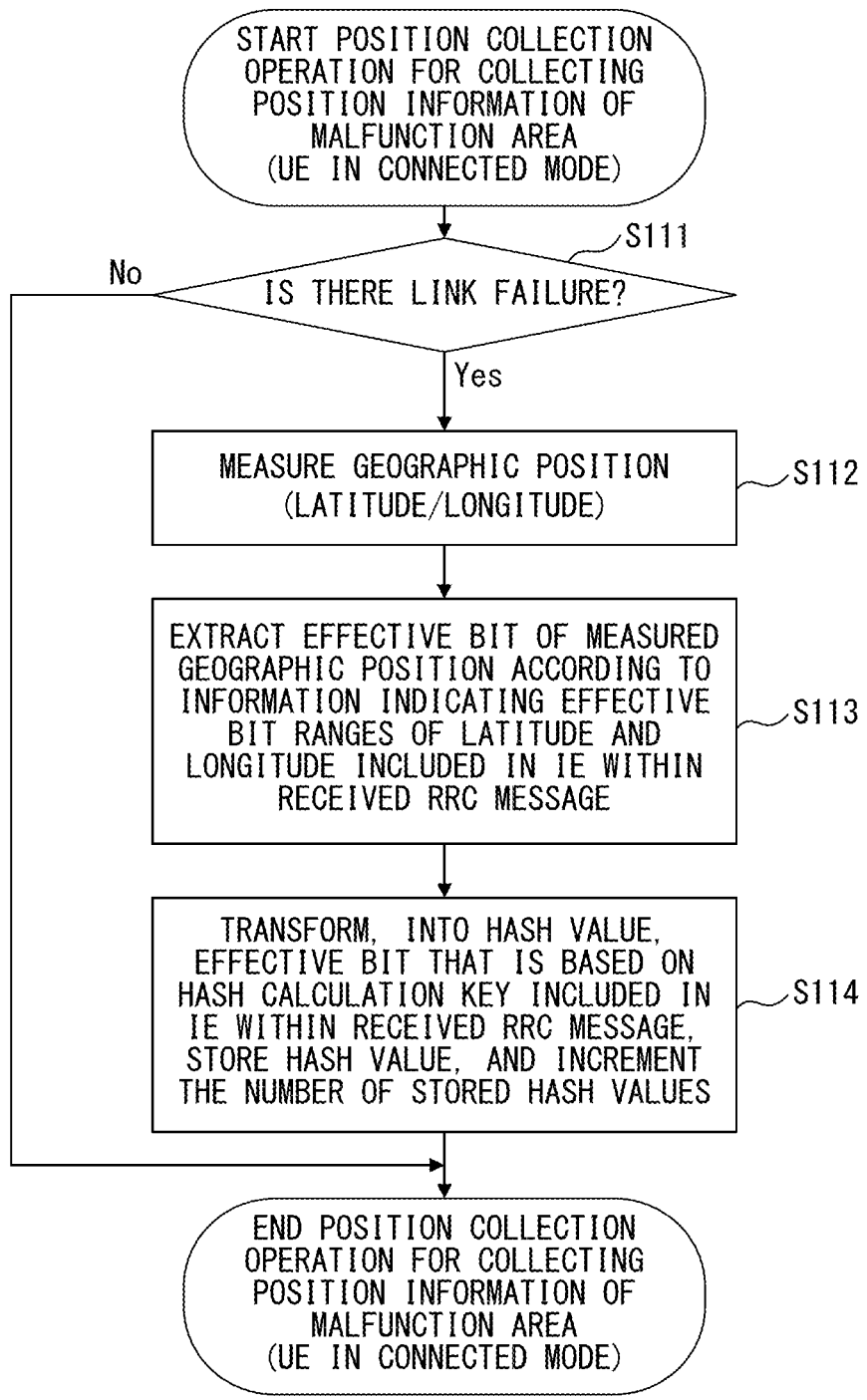
F I G. 1 1

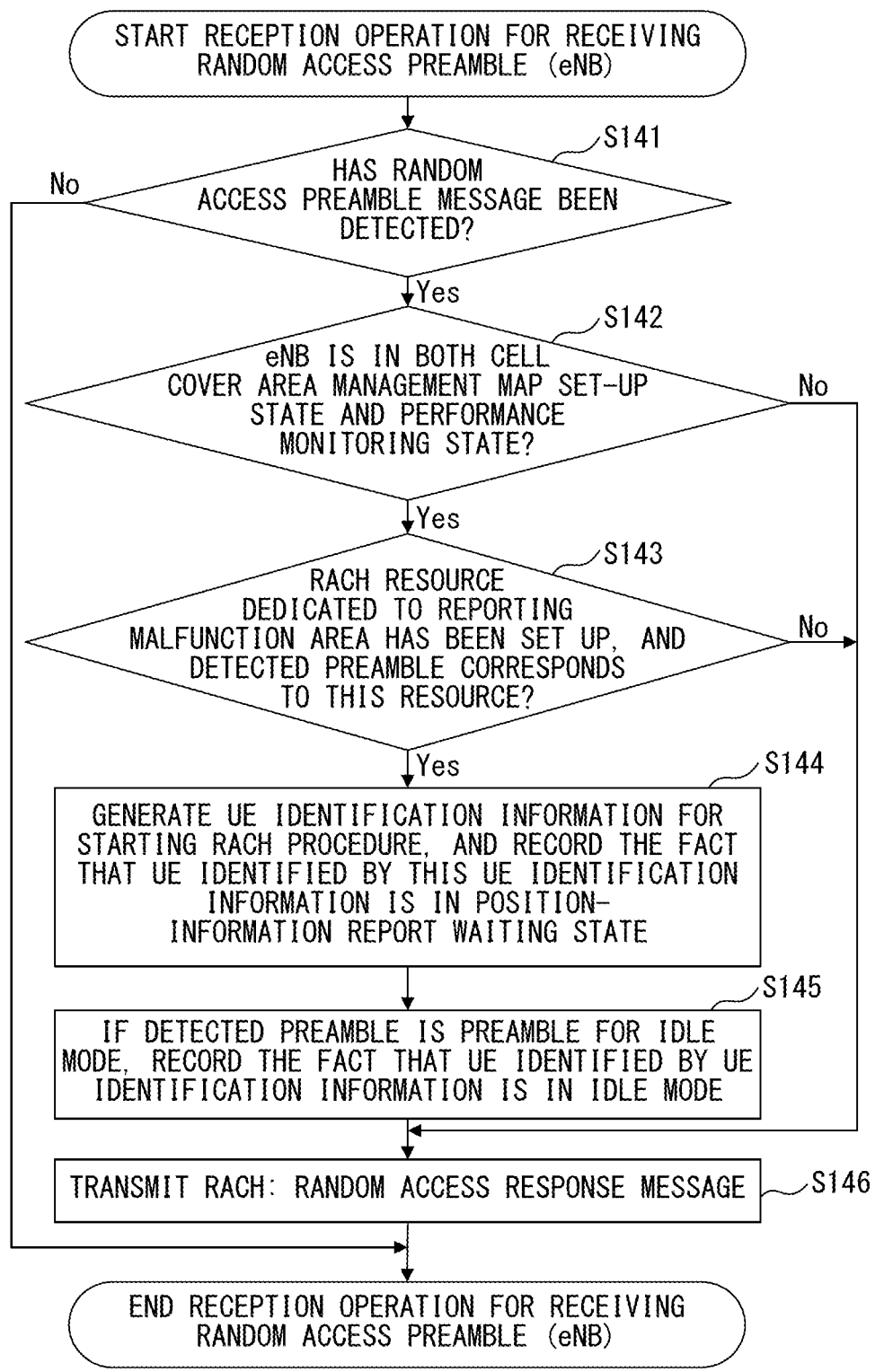
F I G. 1 4

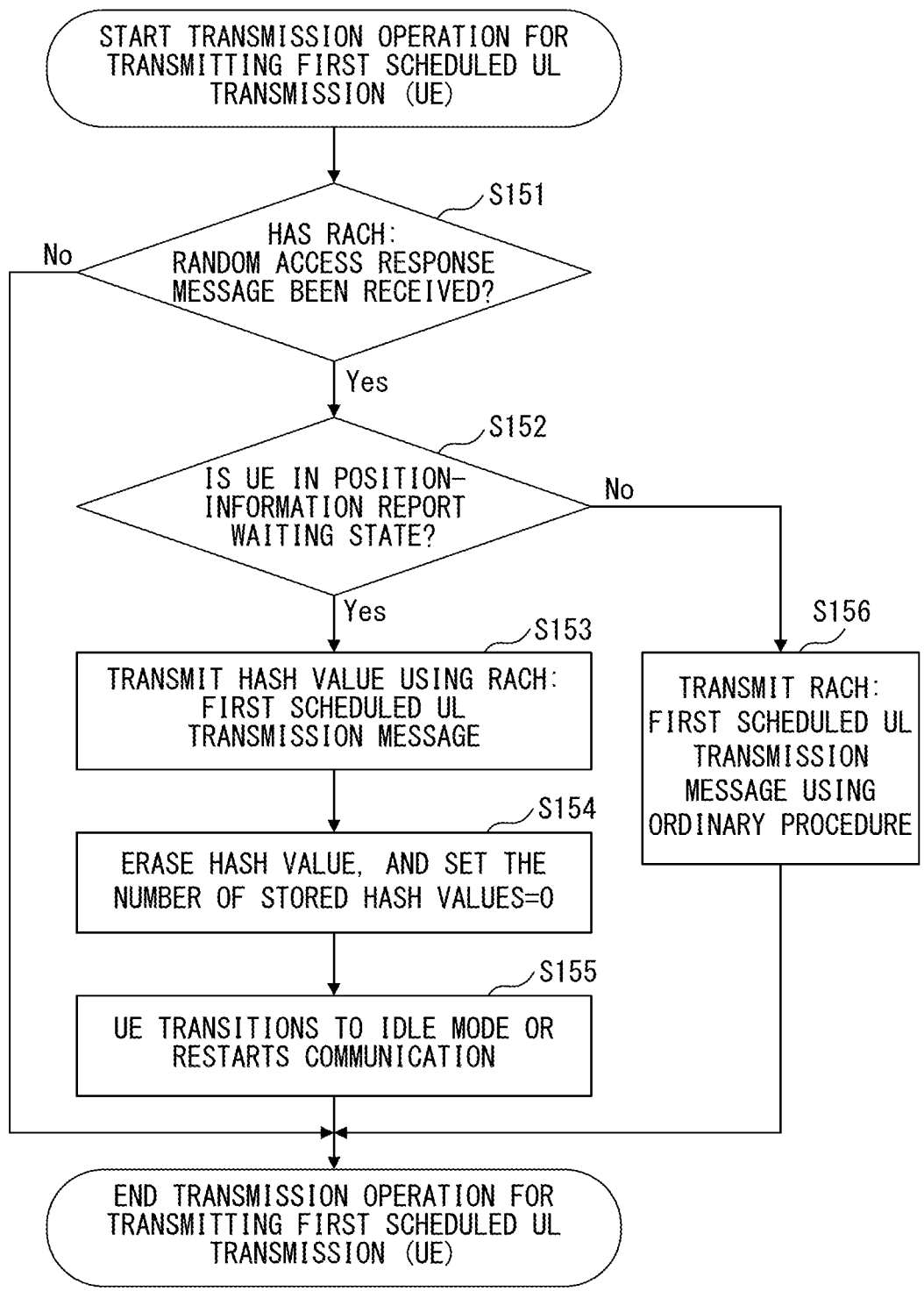
F I G. 15

```
RRC connection re-establishment MESSAGE criticalExtensions        CHOICE{
        rrcConnectionReconfiguration-r8
            >ue-Identity
            >reestablishmentCause
            >spare
        criticalExtensionsFuture
            >POSITION INFORMATION LIST (HASH VALUE)
}
```

F I G.  1 6 A

```
RRC connection request MESSAGE criticalExtensions        CHOICE{
        rrcConnectionReconfiguration-r8
            >ue-Identity
            >establishmentCause
            >spare
        criticalExtensionsFuture
            >POSITION INFORMATION LIST (HASH VALUE)
}
```

F I G.  1 6 B

METHOD FOR IDENTIFYING AREA, WIRELESS BASE STATION, MOBILE TERMINAL, AND WIRELESS COMMUNICATION SYSTEM

CROSS-REFERENCE TO RELATED APPLICATION

This application is a continuation of International Application PCT/JP2010/053783, filed on Mar. 8, 2010, and designated the U.S., the entire contents of which are incorporated herein by reference.

FIELD

The embodiments discussed herein are related to a mobile terminal, a wireless base station, a wireless communication system, and a identification method for identifying the position of an area to which a wireless communication service is not provided by a wireless communication system, e.g., a portable telephone system.

BACKGROUND

It has been known that, in a wireless communication system such as a portable telephone system, due to an influence from an ambient environment of a mobile terminal (e.g., radio wave interference and reflection of radio waves from a building), an area to which a wireless communication service cannot be provided (e.g., a malfunction area) occurs within a communication area (e.g., a cell or a sector) of each wireless base station. In urban regions or the like, a newly constructed building could change the ambient environment of a mobile terminal, and, as a result, in some case, a wireless communication service is not provided to an area to which the wireless communication service was able to be provided before the building was constructed. Accordingly, in terms of automation of system configuration management, performance optimization, and fault handling based on the SON (Self Optimizing Network) which has been investigated in recent years, it is preferable that a wireless base station recognize without fail the position of an area to which a wireless communication service is not provided.

The following is an exemplary technique used by a wireless base station to recognize the position of an area to which a wireless communication service is not provided. First, the position of an area to which a wireless communication service is not provided is detected by a mobile terminal. In particular, when, for example, a mobile terminal in a connected state (or connected mode) enters an area to which a wireless communication service is not provided, wireless communication between the wireless base station and the mobile terminal will be severed. In this case, as position information indicating the position of the area to which the wireless communication service is not provided, the position information indicating the position of the mobile terminal at the time of severing the wireless communication (e.g., position information indicating, for example, latitude or longitude) is obtained by the mobile terminal using, for example, GPS or the like. Meanwhile, when, for example, a mobile terminal in a standby state (or idle mode) enters an area to which a wireless communication service is not provided, the received power from the wireless base station observed on the mobile terminal side will decrease to a predetermined threshold or lower. In this case, as position information indicating the position of the area to which the wireless communication service is not provided, the position information indicating the position of the mobile terminal at the time of decreasing of the received power to the predetermined threshold or lower is obtained by the mobile terminal using, for example, GPS or the like. As a result, the position of the area to which the wireless communication service is not provided is identified on the mobile terminal side. Next, the mobile terminal comes out of the area to which the wireless communication service is not provided and then establishes a communication channel to the wireless base station using a random access procedure (RACH: Random Access Channel). After the communication channel is established via the random access procedure, the mobile terminal establishes a communication channel to a location service node (E-SMLC: Evolved Serving Mobile Location Center) ordered higher than a plurality of wireless base stations, and reports to the location service node the obtained position information indicating the position of the area to which the wireless communication service is not provided. After this, the location service node reports the position information reported from the mobile terminal to a corresponding wireless base station. As a result, the wireless base station may recognize the position of the area to which the wireless communication service is not provided.

[Patent Document]
Patent Document 1: Japanese Laid-open Patent Publication No. 2002-271833
[Non Patent Document]
Non Patent Document 1: 3GPP TS36.305 "Evolved Universal Terrestrial Radio Access Network (E-UTRAN); Stage 2 functional identification of User Equipment (UE) positioning in E-UTRAN"
Non Patent Document 2: 3GPP TR36.902 version 1.2.0 "Evolved Universal Terrestrial Radio Access Network (E-UTRAN); Self-configuring and self-optimizing network (SON) use cases and solutions"

SUMMARY

According to an aspect of the embodiments, an method includes collecting, position information indicating a position of an area to which a wireless communication service is not provided; transmitting the position information from the mobile terminal to a wireless base station using a random access procedure for setting up a communication channel between the wireless base station and the mobile station; and identifying the area which is within a cell range of the wireless base station and to which the wireless communication service is not provided.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 6 is a flowchart illustrating the flow of the initial setting operation performed by the eNB.

FIG. 7 is a flowchart illustrating a flow of a transmission operation for transmitting an RRC message performed by the eNB.

FIG. 8 is a data structure diagram illustrating a message portion which is a portion of the RRC message.

FIG. 10 is a flowchart illustrating a flow of a collection operation for collecting the position information of a malfunction area performed by the UE in an idle mode.

FIG. 11 is a flowchart illustrating a flow of a collection operation for collecting the position information of a malfunction area performed by the UE in a connected mode.

FIG. 14 is a flowchart illustrating a flow of a reception operation for receiving the RACH: Random Access Preamble message performed by the eNB.

FIG. 15 is a flowchart illustrating a transmission operation for transmitting a RACH: First scheduled UL transmission message performed by the UE.

FIG. 16 is a data structure diagram illustrating a message portion which is a portion of an RRC message, wherein the RRC message is defined by a high level protocol of the RACH: First scheduled UL transmission message.

DESCRIPTION OF EMBODIMENTS

Figure 1:
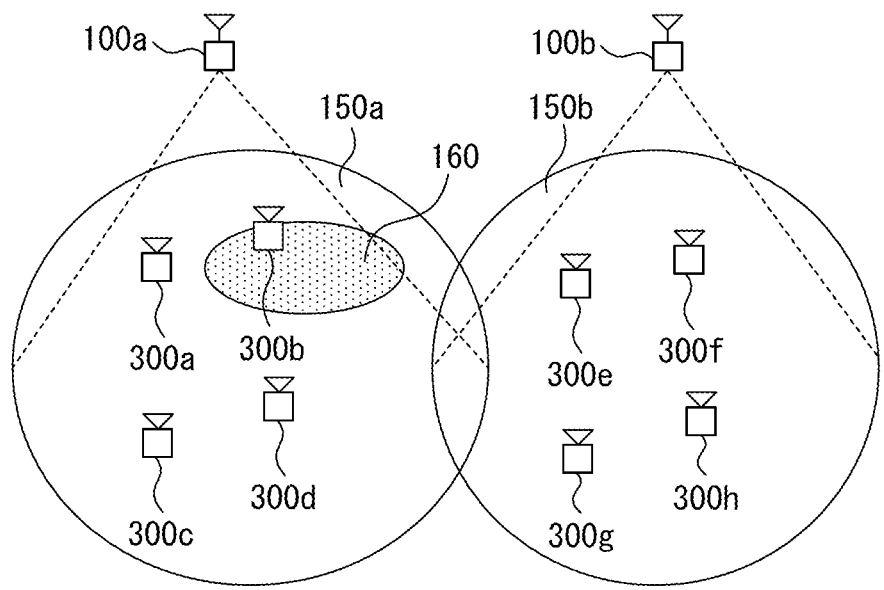
FIG. 1 is a block diagram illustrating an example of a basic configuration of a wireless communication system in accordance with the present embodiment.

The aforementioned technique used by a wireless base station to recognize the position of an area to which a wireless communication service is not provided not only utilizes position information reported from a mobile terminal in a connected state but also utilizes position information reported from many mobile terminals in a standby state. Accordingly, since it is possible to increase the number of samples used to recognize the position of an area to which a radio communication service is not provided, it is also possible to recognize this position more certainly or quickly.

In the meantime, in the aforementioned technique, position information reported from each mobile terminal, is reported from each mobile terminal to the location service node in advance and is then reported from the location service node to each wireless base station. Accordingly, position information reported from many mobile terminals located within the cell ranges of many wireless base stations could be concentrated on the location service node. In particular, in the aforementioned technique, not only the position information reported from a mobile terminal in a connected state but also position information reported from many terminals in a standby state is used, and hence the position information reported from the mobile terminals may possibly be frequently concentrated on the location service node. Accordingly, a high processing load could be applied to the wireless communication system, causing a technical problem of congestion not only in a communication channel between a mobile terminal and the location service node, and but also in the entirety of the wireless communication system.

The aforementioned problem is an example of problems to be solved. An object in one aspect of the embodiment is to provide a wireless base station, a mobile terminal, a wireless communication system, and an area identification method that allows the position of, for example, an area to which a wireless communication service is not provided to be identified while decreasing a processing load.

Means for Solving the Problem

The aforementioned problem is solved by an area identification method including a collection process and a transmission process. The area identification method is performed by a wireless communication system including, for example, a mobile terminal and a wireless base station. In the collection process, the mobile terminal collects position information for identifying the position of an area portion which is a portion of a cell range of the wireless base station and to which a wireless communication service is not provided (i.e., an area in which it is difficult or impossible to use the wireless communication service in a normal way). In the transmission process, a random access procedure for setting up a communication channel between the wireless base station and the mobile terminal is used to transmit the position information from the mobile terminal to the wireless base station. More particularly, as an example, in the transmission process, a message defined in accordance with the random access procedure is used (i.e., another message transmitted after the defined message is not used) to directly transmit the position information from the mobile terminal to the wireless base station.

The aforementioned problem may also be solved by a wireless base station including reception means and identification means. Using a random access procedure, the reception means receives position information that identifies the position of an area to which a wireless communication service is not provided and that is transmitted from a mobile terminal. In other words, the reception means receives within the random access procedure the position information transmitted using the random access procedure from the mobile terminal. According to the position information received by the reception means, the identification means identifies the position of the area to which a wireless communication service is not provided.

The aforementioned problem may also be solved by a mobile terminal including collection means and transmission means. The collection means collects position information for identifying the position of an area to which a wireless communication service is not provided. Using a random access procedure, the transmission means transmits position information to a wireless base station.

Effect of the Invention

In accordance with the aforementioned area identification method, using the random access procedure, as an initial procedure performed when a communication channel is established between a mobile terminal and a wireless base station, position information indicating the position of an area to which a wireless communication service is not provided may be transmitted from the mobile terminal to the wireless base station. Accordingly, it is not needed to report position information from mobile terminals to a location service node and to then report the position information from the location service node to each wireless base station. It is thus possible to prevent position information from being transmitted concentratedly to the location service node in a preferable manner. As a result, a processing load on the wireless communication system may be made to be relatively small.

In the meantime, in accordance with the wireless base station, the mobile terminal, and the wireless communication system described above, a random access procedure used to transmit position information indicating the position of an area to which a wireless communication service is not provided is transmitted from a mobile terminal to a wireless base station. Accordingly, in accordance with the wireless base station, the mobile terminal, and the wireless communication system described above, it is possible to achieve an advantage similar to the advantage achieved by the aforementioned area identification method.

In the following, embodiments will be described according to the drawings.

(1) Entire Configuration of Wireless Communication System

With reference to FIG. 1, an example of the entire configuration of a wireless communication system 1 in accordance with the present embodiment will be described. FIG. 1 is a block diagram illustrating an example of the entire configuration of a wireless communication system 1 in accordance with the present embodiment.

As illustrated in FIG. 1, the wireless communication system 1 in accordance with the present embodiment includes an eNB (evolved Node B) 100a, an eNB 100b, a UE (User Equipment) 300a, a UE 300b, a UE 300c, a UE 300d, a UE 300e, a UE 300f, a UE 300g, and a UE 300h. Note that the number of eNBs 100 and the number of UEs 300 illustrated in FIG. 1 are examples and thus is not limited to the numbers indicated in FIG. 1. For convenience of description, when descriptions are given without distinguishing the eNB 100a and the eNB 100b from each other, both the eNB 100a and the eNB 100b will be referred to as "eNB 100". Similarly, when descriptions are given without distinguishing the UEs 300a to 300h from each other, all of the UEs 300a to 300h will be referred to as "UE 300".

The eNB 100 is a wireless base station covering a cell 150 having a cell radius ranging approximately from several kilometers to a dozen kilometers or so or from several kilometers to several tens of kilometers. As an example, in the example illustrated in FIG. 1, the eNB 100a is a wireless base station covering a cell 150a, and the eNB 100b is a wireless base station covering a cell 150b. The eNB 100 performs wireless communication with a UE 300 positioned within the cell 150 covered by the eNB 100. That is, the eNB 100 establishes a communication connection to the UE 300 positioned within the cell 150 covered by the eNB 100 and transmits data to the UE 300 or receives data from the UE 300. A cell 150 covered by each eNB 100 may partially overlap with a portion of or the entirety of another cell 150 or not overlap at all with another cell 150.

In the descriptions above, the eNB 100 covering the cell 150 having a cell radius ranging approximately from several kilometers to a dozen kilometers or so or from several kilometers to several tens of kilometers (what is called a "macro cell") is described. However, in addition to or instead of the eNB 100, a wireless base station covering a cell having a cell radius ranging approximately from several hundred meters to one kilometer (what is called a "micro cell") or a wireless base station covering a cell having a cell radius ranging approximately from several meters to a dozen meters or so or from several meters to several tens of meters (what is called a "phantom cell") may be provided. Various wireless base stations covering cells having cell radiuses other than those described above may be provided. In the example illustrated in FIG. 1, one cell 150 corresponds to one eNB 100, but a plurality of cells 150 (or sectors) may correspond to one eNB 100.

A UE 300 is a mobile terminal that establishes a communication channel (or connection) to a wireless base station 100 corresponding to a cell 150 within which the UE 300 is positioned and that transmits data to or receives data from the wireless base station 100. UEs 300 are distinguished in accordance with, for example, whether or not a communication channel has been established between the UEs 300 and the eNB 100. In the present embodiment, a UE 300 that has established a communication channel to an eNB 100 will be referred to as a UE 300 in a connected mode. Meanwhile, a UE 300 that has not established a communication channel to an eNB 100 will be referred to as a UE 300 in an idle mode. Examples of the UE 300 are portable telephones and various information terminals provided with a wireless communication function (e.g., PDA, mini PC, note PC, and desktop PC). The UE 300 may use various wireless communication services (e.g., a mail service, voice call service, WEB browsing service, and packet communication service) via an eNB 100 (in addition, via, for example, a core network (not illustrated) connected at an order higher than the eNB 100).

Meanwhile, depending on an ambient environment of the UE 300 (i.e., an environment within the cell 150), a malfunction area 160, an area to which a wireless communication service cannot be provided, may occur within the cell 150. As an example, an area where a radio wave from the eNB 100 is blocked by a building within the cell 150 may be the malfunction area 160. When UE 300 positioned within the malfunction area 160, the UE 300 cannot use a wireless communication service.

In the present embodiment, the UE 300 which has entered the malfunction area 160 collects the position information of the malfunction area 160, and the collected position information of the malfunction area 160 is transmitted to the eNB 100 from the UE 300 which has come out of the malfunction area 160. As a result, the eNB 100 may recognize the position of the malfunction area 160 in a preferable manner, and the malfunction area 160 may be eliminated (or a service failure may be eliminated). In the following, a collection operation and a transmission operation for the position information of the malfunction area 160 will be described in detail.

A wireless communication system conforming to, for example, LTE (Long Term Evolution) or E-UTRAN (Evolved Universal Terrestrial Radio Access Network) is an example of the wireless communication system 1. However, the wireless communication system 1 may conform to any standard other than LTE and E-UTRAN.

(2) Block Diagram

Figure 2:
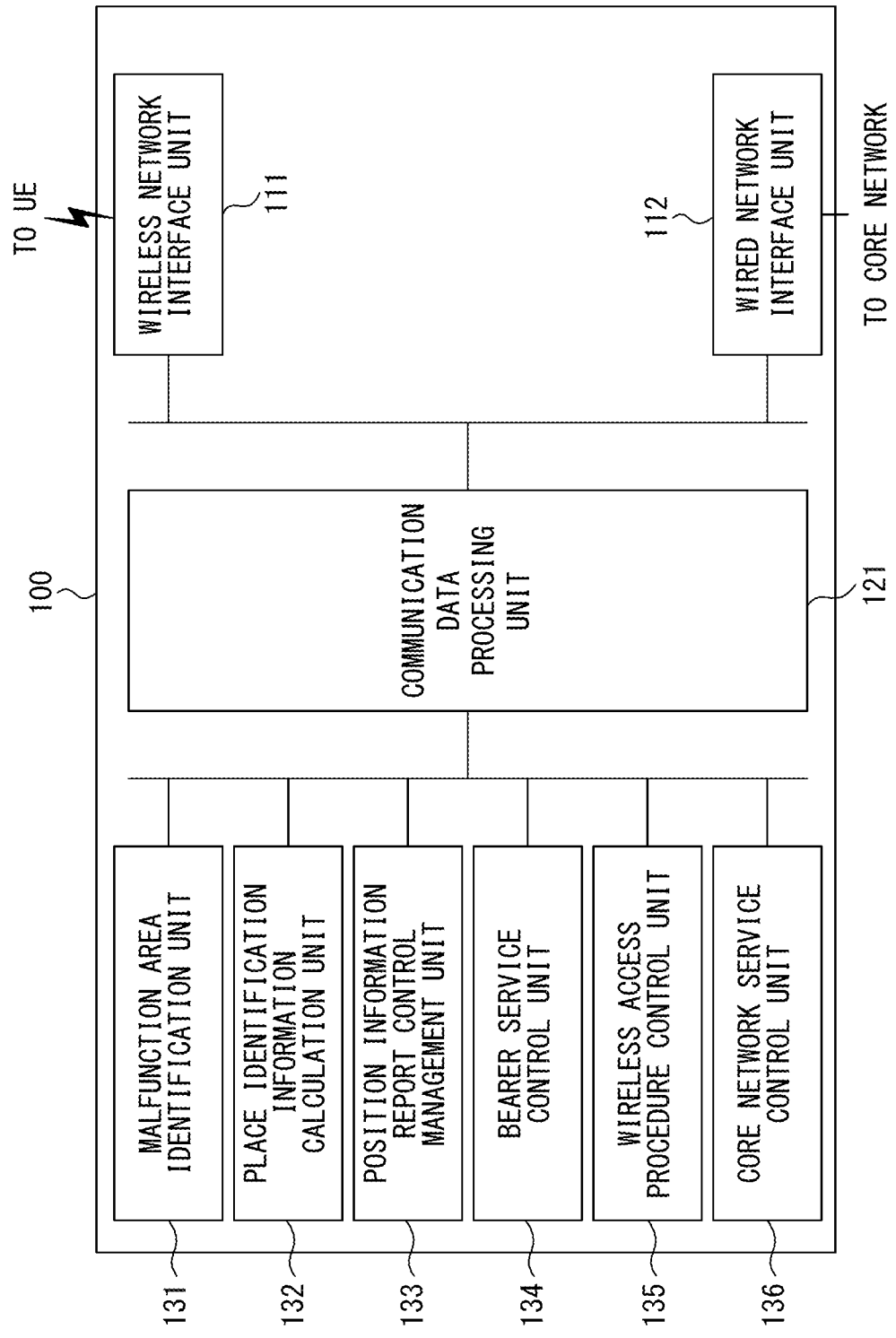
FIG. 2 is a block diagram illustrating an example of a configuration of an eNB included in the wireless communication system.
Figure 3:
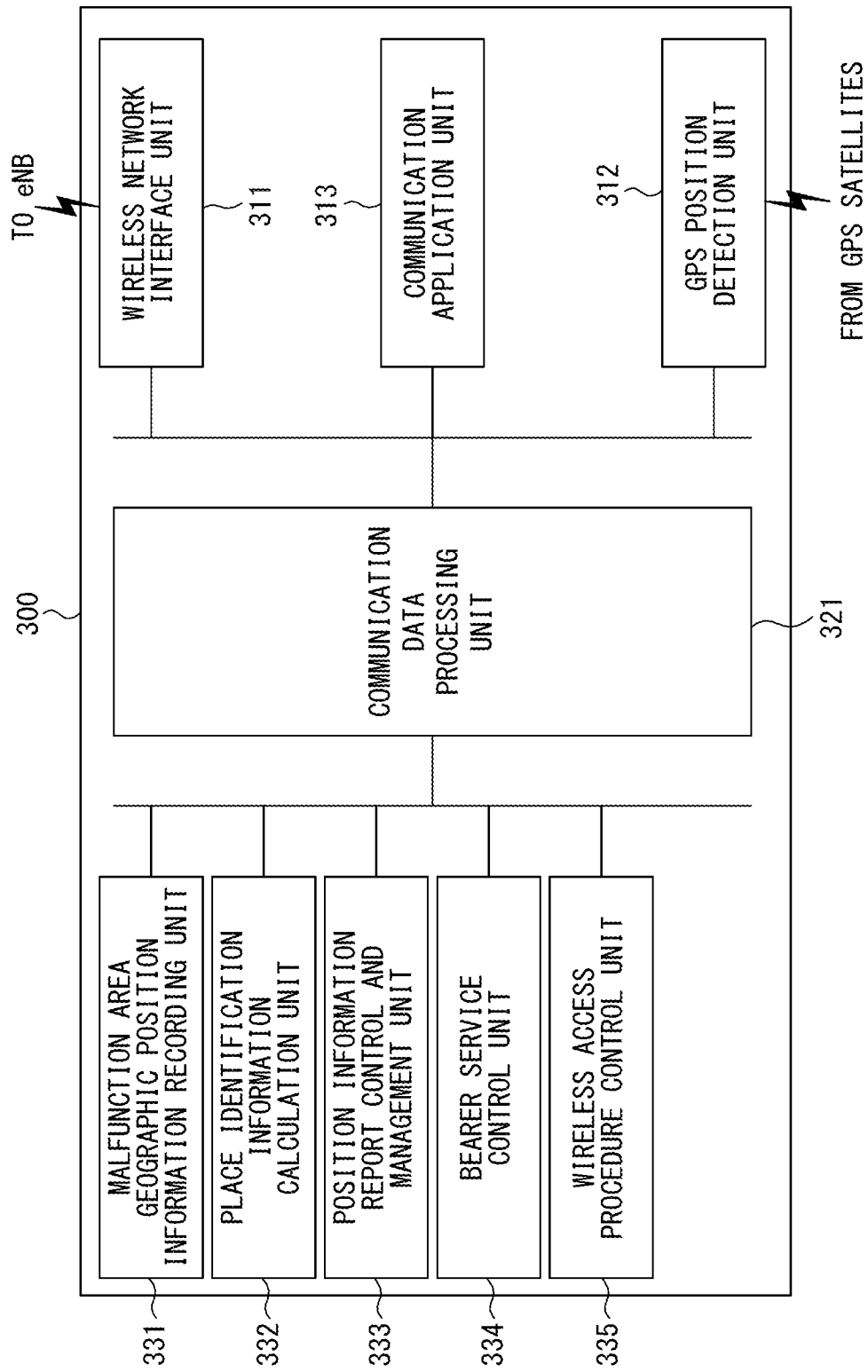
FIG. 3 is a block diagram illustrating an example of a configuration of a UE included in the wireless communication system.

With reference to FIG. 2 and FIG. 3, an example of the respective configurations of the eNB 100 and the UE 300 included in the wireless communication system 1 will be described.

(2-1) Block Diagram of ENB

With reference to FIG. 2, an example of the configuration of the eNB 100 included in the wireless communication system 1 will be described. FIG. 2 is a block diagram illustrating an example of the configuration of the eNB 100 included in the wireless communication system 1.

As illustrated in FIG. 2, the eNB 100 includes a wireless network interface unit 111, a wired network interface unit 112, a communication data processing unit 121, a malfunction area identification unit 131, a place identification information calculation unit 132, a position information report control management unit 133, a bearer service control unit 134, a wireless access procedure control unit 135, and a core network service control unit 136.

The wireless network interface unit 111 terminates the L1/L2 protocol to which it needs to conform to communicate with the UE 300 (e.g., to transmit data to or receive data from the UE 300 via wireless communication) and communicates with the UE 300.

The wired network interface unit 112 terminates the L1/L2 protocol to which it needs to conform to communicate with a core network (not illustrated) (e.g., data transmission and reception via wired communication) and communicates with the core network. Examples of apparatuses belonging to the core network include a mobile management entity (MME), a system architecture evolution gateway (SAE-GW) or the like.

According to setting information on a communication channel set up by the bearer service control unit 134 (or bearer control information), the communication data processing unit 121 transfers (or routing) data and performs various processes associated with a data transfer protocol. Meanwhile, the communication data processing unit 121 recognizes signaling information such as a wireless access procedure message and transmits or receives the signaling message to or from a corresponding processing unit or function unit within the eNB 100.

The malfunction area identification unit 131 manages the cell 150 covered by the eNB 100 as a cell cover area management map, which will be described hereinafter. When place identification information (e.g., a hash value) calculated from geographic position information (e.g., latitude and longitude) of the malfunction area 160 is transmitted from the UE 300, as will be described later in detail, the malfunction area identification unit 131 manages the malfunction area 160 using an address (or ID) on the cell cover area management map which corresponds to the place identification information.

According to a predetermined calculation rule, the place identification information calculation unit 132 calculates place identification information corresponding to an address (or ID) on the cell cover area management map from geographic position information such as latitude, longitude or the like. The place identification information is preferably information obtained by applying arithmetic processing or transform processing based on a predetermined calculation rule to the geographic position information. An example of the place identification information is a hash value obtained by performing a hash operation based on a predetermined hash calculation key on the geographic position information. As a result, the address (or ID) on the cell cover area management map is associated with the place identification information (e.g., a hash value). The amount of place identification information is preferably smaller than that of geographic position information. Accordingly, it is preferable that place identification information be obtained via the aforementioned hash operation after some high-order bits and some low-order bits of bit data indicating geographic position information are deleted. In other words, place identification information is preferably obtained by performing the aforementioned hash operation on only effective bit data from among the bit data indicating geographic position information. In the following, a configuration will be described in which a hash value is used as an example of place identification information.

The position information report control and management unit 133 reports to the UE 300 calculation method information indicating a calculation rule (e.g., a hash calculation key or a bit data effective range) used when the place identification information calculation unit 132 calculates place identification information (e.g., a hash value). The position information report control and management unit 133 also reports to the UE 300 transmission method information indicating a method used by the UE 300 to transmit the place identification information to the eNB 100 (e.g., a RACH (Random Access Channel) preamble list or the like, which will be described hereinafter).

By performing a setting up or releasing process for setting up or releasing a communication channel, the bearer service control unit 134 manages bearer control information defining an operation in the communication data processing unit 121. The bearer service control unit 134 also manages a state of the communication channel (e.g., checks whether there is a link failure or the like).

The wireless access procedure control unit 135 terminates transmission or reception of signaling information to or from the UE 300. An example of the signaling information is a RACH message (or random access procedure message) transmitted or received using RACH.

The core network service control unit 136 terminates transmission or reception of signaling information to or from the core network and performs a setting up or releasing process for setting up or releasing a communication channel other than the communication channel between the UE 300 and the eNB 100 (or a wireless zone).

(2-2) Block Diagram of UE

With reference to FIG. 3, an example of the configuration of the UE 300 included in the wireless communication system 1 will be described. FIG. 3 is a block diagram illustrating an example of the configuration of UE 300 included in the wireless communication system 1.

As illustrated in FIG. 3, the UE 300 includes a wireless network interface unit 311, a GPS (Global Positioning System) position detection unit 312, a communication application unit 313, a communication data processing unit 321, a malfunction area geographic position information recording unit 331, a place identification information calculation unit 332, a position information report control and management unit 333, a bearer service control unit 334, and a wireless access procedure control unit 335.

The wireless network interface unit 311 terminates the L1/L2 protocol which needs to be conformed to in order to communicate with the eNB 100 (e.g., to transmit data to or receive data from the eNB 100 via wireless communication) and communicates with the eNB 100.

By receiving a GPS radio wave transmitted from GPS satellites, the GPS position detection unit 312 obtains geographic position information indicating the position of the UE 300 with latitude and longitude.

The communication application unit 313 runs an application used by a user of the UE 300 (e.g., voice call application, packet communication application, mail application, WEB browsing application, or the like) to be operated. The communication application 313 is designated as a destination and a source of data transmitted to or received from another UE 300 that is a communications partner.

According to setting information on a communication channel set up by the bearer service control unit 334 (or bearer control information), the communication data processing unit 321 transfers (or routing) data and performs various processes associated with a data transfer protocol. Meanwhile, the communication data processing unit 321 recognizes signaling information such as a wireless access procedure message and transmits or receives the signaling message to or from a corresponding processing unit or function unit within the UE 300.

When the UE 300 enters the malfunction area 160, the malfunction area geographic position information recording unit 331 receives geographic position information from the GPS position detection unit 312. That is, the malfunction area geographic position information recording unit 331 obtains and records the geographic position information on the malfunction area 160.

According to a calculation rule (e.g., a hash calculation key or a bit data effective range) indicated by the calculation method information transmitted from the position information report control and management unit 133 provided in the eNB 100, the place identification information calculation unit 332 calculates place identification information (e.g., a hash value) corresponding to an address (or ID) on a cell cover area management map from the geographic position information on the malfunction area 160 recorded by the malfunction area geographic position information recording unit 331.

The position information report control and management unit 333 manages the calculation method information transmitted from the position information report control and management unit 133 provided in the eNB 100. The position information report control and management unit 333 also manages transmission method information (e.g., a RACH preamble list, which will be described hereinafter) transmitted from the position information report control and management unit 133 provided in the eNB 100. In addition, using the transmission method information transmitted from the position information report control and management unit 133 provided in the eNB 100, the position information report control and management unit 333 transmits, to the eNB 100, the place identification information calculated by the place identification information calculation unit 332.

By performing a setting up or releasing process for setting up or releasing a communication channel, the bearer service control unit 334 manages bearer control information defining an operation in the communication data processing unit 321. The bearer service control unit 334 also manages a state of the communication channel (e.g., checks whether there is a link failure or the like).

The wireless access procedure control unit 335 terminates transmission or reception of signaling information to or from the eNB 100. An example of the signaling information is a RACH message (or random access procedure message) transmitted or received using RACH.

(3) Descriptions of Operations

With reference to FIG. 4 to FIG. 17, an example of an operation flow of the wireless communication system 1 in accordance with the present embodiment (e.g., an operation for transmitting position information indicating the position of the malfunction area 160 from the UE 300 to the eNB 100) will be described.

(3-1) Entire Operation

Figure 4:
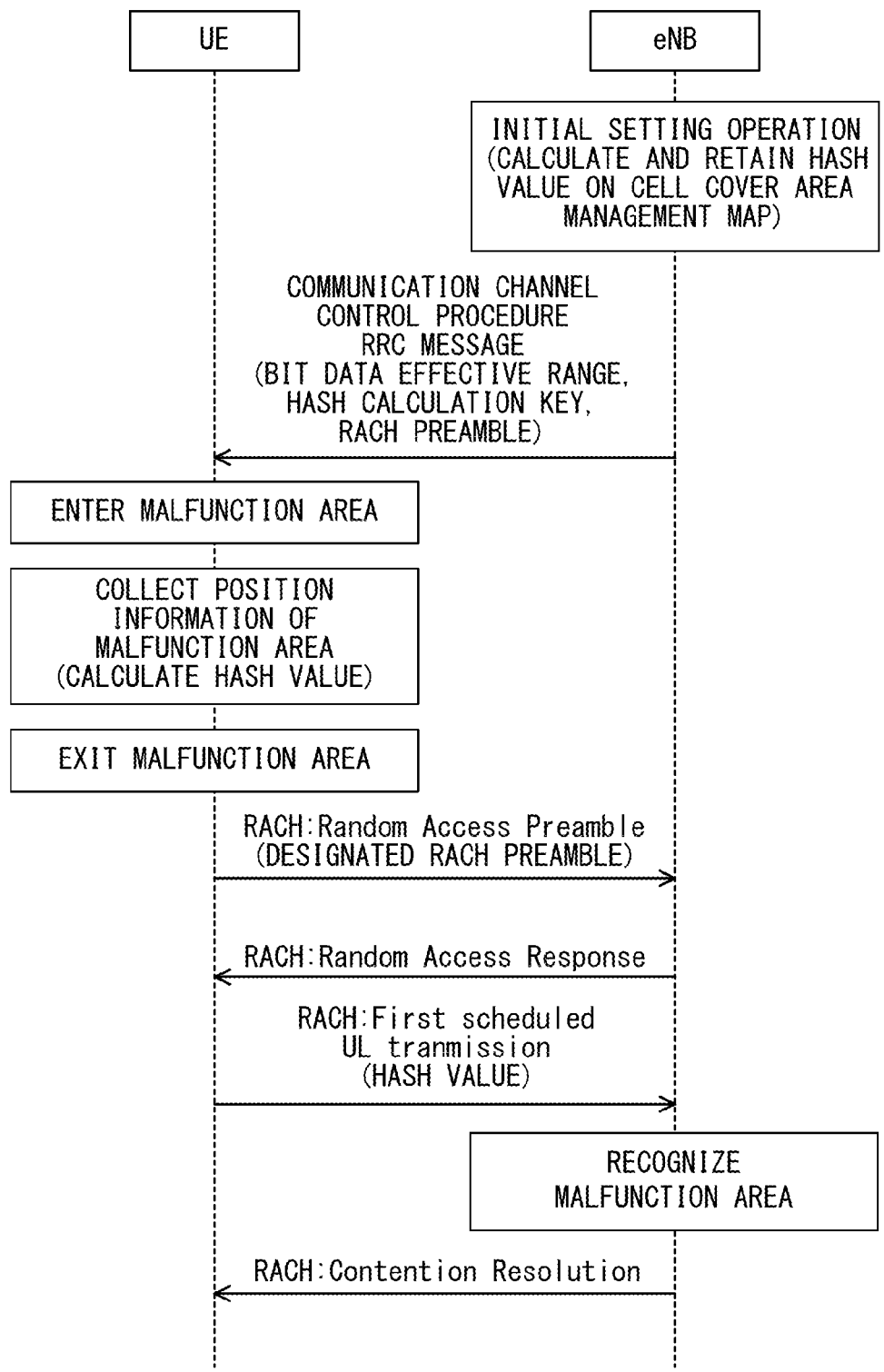
FIG. 4 is a sequence diagram schematically illustrating the entirety of an operation flow of the wireless communication system in accordance with the present embodiment.

First, with reference to FIG. 4, the entirety of the operation flow of the wireless communication system 1 in accordance with the present embodiment will be schematically described. FIG. 4 is a sequence diagram schematically illustrating the entirety of an operation flow of the wireless communication system 1 in accordance with the present embodiment.

As illustrated in FIG. 4, the eNB 100 performs an initial setting operation in the beginning. Examples of the initial setting operation are: a generation operation for generating a cell cover area management map for managing the cell 150 covered by the eNB 100; a generation operation for generating a calculation method indicating a calculation rule (e.g., a hash calculation key or a bit data effective range) for transforming geographic position information (e.g., latitude and longitude) on the malfunction area 160 into place identification information (e.g., a hash value); and a generation operation for generating transmission method information indicating a method for transmitting place identification information from the UE 300 to the eNB 100 (e.g., a RACH preamble list).

Using an RRC (Radio Resource Configuration) message, the eNB 100 then transmits, to the UE 300, various pieces of control information that have been set via the initial setting operation. Examples of these transmitted control information are the calculation method information indicating the hash calculation key or the bit data effective range that are set in the initial setting operation and the transmission method information indicating the RACH preamble list.

Next, when the UE 300 enters the malfunction area 160, the UE 300 collects the position information of the malfunction area 160 which it has entered. Identifically, as geographic position information on the malfunction area 160, the UE 300 obtains geographic position information on the UE 300 detected at the point of entering the malfunction area 160 by the GPS position detection unit 312. After this, according to control information transmitted from the eNB 100 using the RRC message, the UE 300 calculates place identification information (e.g., a hash value) from the obtained geographic position information.

Subsequently, the UE 300 uses the RACH message (or random access procedure message) after exiting from the malfunction area 160 to transmit the calculated place identification information (e.g., a hash value) to the eNB 100. Identifically, the UE 300 uses a RACH resource designated by a RACH preamble list to transmit a RACH: Random Access Preamble message to the eNB 100. The eNB 100, which has received the RACH: Random Access Preamble message, transmits a RACH: Random Access Response message to the UE 300. The UE 300, which has received the RACH: Random Access Response message, transmits, to the eNB 100, a RACH: First scheduled UL transmission message including place identification information (e.g., a hash value). As a result, the eNB 100 may obtain place identification information indicating the position of the malfunction area 160. Accordingly, using an address (or ID) on a cell cover area management map corresponding to place identification information (e.g., a hash value), the eNB 100 may recognize and manage the position of the malfunction area 160. After this, the eNB 100, which has received the RACH: First scheduled UL transmission message, transmits a RACH: Contention Resolution message to the UE 300.

In regard to the operation flow described above, details of each operation will be described in the following. Identifically, (i) using FIG. 5 and FIG. 6, an initial setting operation by the eNB 100 will be described, (ii) using FIG. 7 to FIG. 9, a transmission operation for transmitting an RRC message from the eNB 100 to the UE 300 will be described, (iii) using FIG. 10 and FIG. 11, a collection operation by the UE 300 for collecting the position information of the malfunction area 160 will be described, (iv) using FIG. 12 and FIG. 13, a transmission operation by the UE 300 for transmitting a RACH: Random Access Preamble message will be described, (v) using FIG. 14, a reception operation by the eNB 100 for receiving a RACH: Random Access Preamble message will be described, (vi) using FIG. 15 and FIG. 16, a transmission process by the UE 300 for transmitting a RACH; First scheduled UL transmission message will be described, and (vii) using FIG. 17, a reception operation by the eNB 100 for receiving a RACH: First scheduled UL transmission message will be described.

(3-2) Initial Setting Operation

Figure 5:
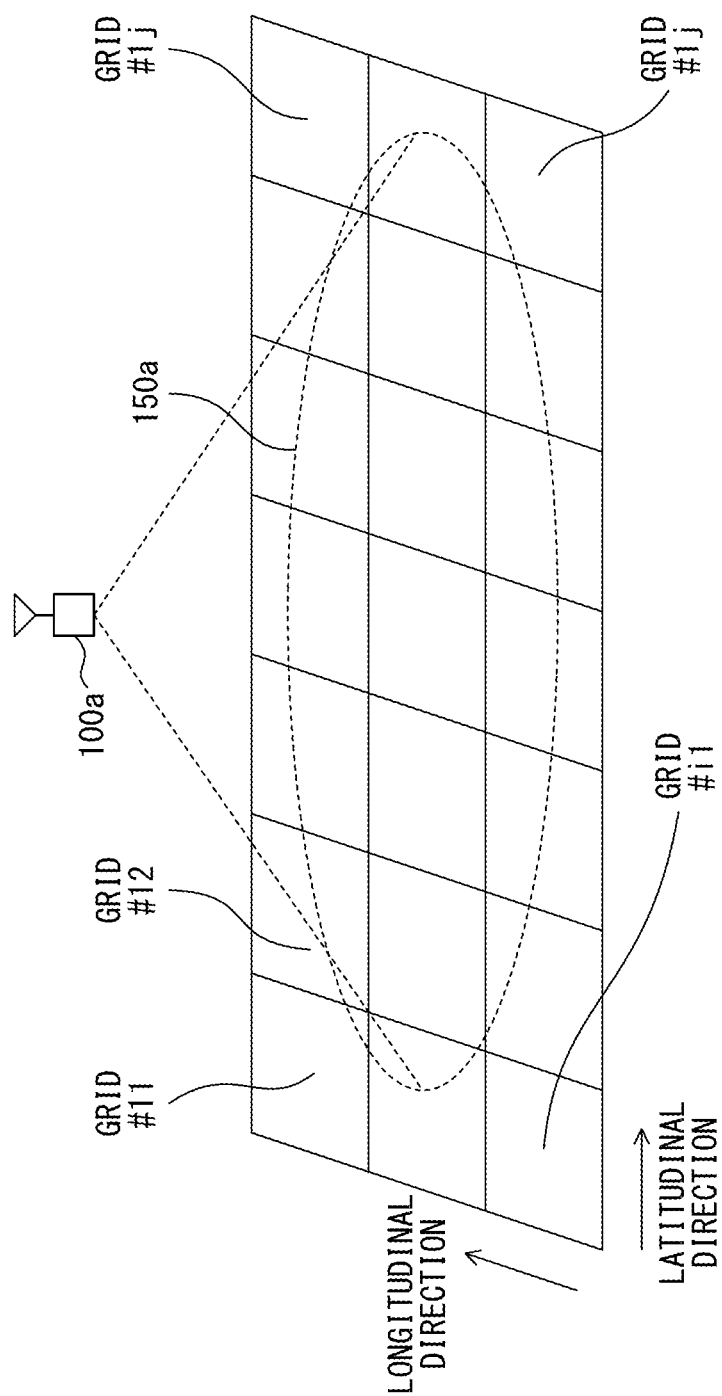
FIG. 5 is a schematic view illustrating a cell cover area management map set up in an initial setting operation.

With reference to FIG. 5 and FIG. 6, the initial setting operation performed by the eNB 100 will be described. FIG. 5 is a schematic view illustrating a cell cover area management map set up in the initial setting operation, and FIG. 6 is a flowchart illustrating the flow of the initial setting operation performed by the eNB 100.

As illustrated in FIG. 5, the cell cover area management map set up in the initial setting operation is a map divided into a plurality of grids arranged in a matrix configuration with i (an integer that is one or higher) longitudinal rows and j (an integer that is one or higher) latitudinal columns, and the map has a size such that the cell 150 is within the map. A grid ID is assigned to each grid, and the grid ID uniquely corresponds to a hash value (i.e., place identification information). Accordingly, a particular area portion within the cell 150 may be uniquely identified by one grid ID corresponding to a hash value calculated from geographic position information.

The cell cover area management map illustrated in FIG. 5 is set up via the initial setting operation illustrated in FIG. 6. As illustrated in FIG. 6, the malfunction area identification unit 131 determines whether or not a cell cover area management map needs to be set up (step S051). Note that an operator of the eNB 100 may determine in advance whether or not a cell cover area management map needs to be set up.

When it is determined as a result of the determination in step S051 that the cell cover area management map is not to be set up (step S051: No), the eNB 100 ends the operation. In this case, the eNB 100 may perform an operation to be normally performed (or an existing operation performed by the eNB 100).

Meanwhile, when it is determined as a result of the determination in step S051 that the cell cover area management map needs to be set up (step S051: Yes), the malfunction area identification unit 131 sets a hash calculation key (step S052). The malfunction area identification unit 131 also designates the latitude and the longitude of the eNB 100 and designates a respective bit data effective range for the latitude and the longitude (step S052). As an example, respective bit data portions of bit data for the latitude and the longitude, not including a portion of high-order bit data common to the entirety of the cell 150 and a portion of low-order bit data indicating an area portion that is smaller than the particles managed by the cell cover area management map, are designated by the malfunction area identification unit 131 as the respective bit data effective ranges for the latitude and the longitude. More particularly, when, for example, the latitude of the cell 150 is indicated by the value "north latitude 40 degrees 20 minutes xx (variable) seconds", a bit data portion of the bit data indicating the latitude not including a portion of high-order bit data corresponding to a common value, "north latitude 40 degrees and 20 minutes", is designated as the bit data effective range of the latitude. When, for example, the latitudinal direction extent of one grid of the cell cover area map corresponds to the distance "100 m", a bit data portion of bit data indicating the latitude not including a portion of low-order bit data indicating the latitude to an accuracy of "100 m" or less is designated as the bit data effective range of the latitude. These are also true for the longitude.

Next, the position information report control and management unit 133 determines whether or not to designate a dedicated RACH resource that is used to report the position information of the malfunction area 160 from the UE 300 to the eNB 100 (Identically, a hash value is transmitted, for example) (step S053).

When it is determined as a result of the determination in step S053 that the dedicated RACH resource is not to be designated (step S053: No), the eNB 100 ends the operation. In this case, the eNB 100 may perform an operation to be normally performed.

Meanwhile, when it is determined as a result of the determination in step S053 that the dedicated RACH resource needs to be designated (step S053: Yes), the position information report control and management unit 133 designates the dedicated RACH resource that is used to report the position information of the malfunction area 160 from the UE 300 to the eNB 100 (step S054). In particular, the position information report control and management unit 133 sets up a RACH preamble list including a RACH resource to be used when the aforementioned RACH: Random Access Preamble message is transmitted. In this case, the position information report control and management unit 133 may set up and distinguish between a RACH preamble list including a RACH resource to be used by the UE 300 in an idle mode and a RACH preamble list including a RACH resource to be used by the UE 300 in a connected mode. Alternatively, the position information report control and management unit 133 may set up and not need to distinguish between a RACH preamble list including a RACH resource to be used by the UE 300 in the idle mode and a RACH preamble list including a RACH resource to be used by the UE 300 in the connected mode (or only one RACH preamble list may be set up).

(3-3) Transmission Operation for Transmitting RRC Message from eNB to UE

Figure 9:
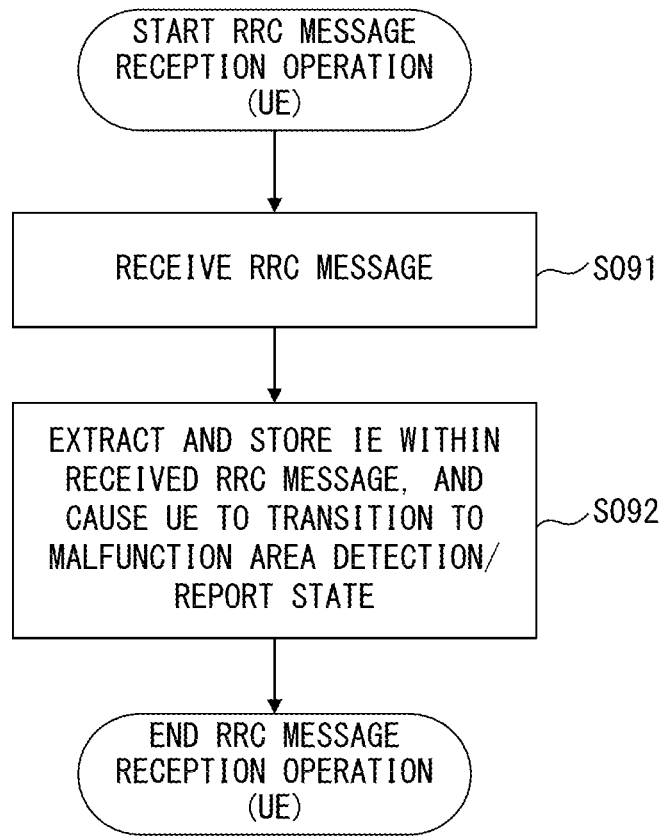
FIG. 9 is a flowchart illustrating a flow of a reception operation for receiving the RRC message performed by the UE.

With reference to FIG. 7 to FIG. 9, a transmission operation for transmitting an RRC message from the eNB 100 to the UE 300 will be described. FIG. 7 is a flowchart illustrating a flow of the transmission operation for transmitting an RRC message performed by the eNB 100, FIG. 8 is a data structure diagram illustrating a message portion which is a portion of the RRC message, and FIG. 9 is a flowchart illustrating a flow of a reception operation of the RRC message performed by the UE 300.

As illustrated in FIG. 7, the position information report control and management unit 133 provided in the eNB 100 determines whether the eNB 100 is in both a map set-up state in which a cell cover area management map is set up and a performance monitoring state (step S071). The performance monitoring state is a state in which the eNB 100 is being operated to recognize the position of the malfunction area 160 and the eNB 100 is allowing, for example, a hash value indicating the position of the malfunction area 160 to be reported from the UE 300.

When it is determined as a result of the determination in step S071 that the eNB 100 is not in the map set-up state or is not in the performance monitoring state (step S071: No), the eNB 100 may end the operation or may repeat the operations of step S071 and after.

Meanwhile, when it is determined as a result of the determination in step S071 that the eNB 100 is in the map set-up state and the performance monitoring state (step S071: Yes), the position information report control and management unit 133 adds a malfunction area position report control IE including a hash calculation key, a bit data effective range, and a RACH preamble list to a RRC message to be transmitted to the UE 300 (step S072). As long as a malfunction area position report control IE is added to the RRC message, a malfunction area position report control IE may be added at any position. As an example, as illustrated in FIG. 8, a malfunction area position report control IE may be added to the field "criticalExtensions", which is one of the fields for extension within the RRC message, or may be added to another field.

After this, the position information report control and management unit 133 transmits the RRC message, which has added to it a malfunction area position report control IE in step S072, to the UE 300 via the communication data processing unit 121 and the wireless network interface unit 111 (step S073).

Next, as illustrated in FIG. 9, the position information report control unit 333 provided in the UE 300 receives the RRC message including a malfunction area position report control IE via the communication data processing unit 321 and the wireless network interface unit 311 (step S091). After this, the position information report control unit 333 extracts a malfunction area position report control IE included in the RRC message and stores a hash calculation key, a bit data effective range, and a RACH preamble list indicated by the malfunction area position report control IE in, for example, a memory (not illustrated) (step S092). Subsequently, the UE 300 transitions to a malfunction area detection/report state to collect the position information of the malfunction area 160, as will be described in the following.

(3-4) Collection Operation for Collecting Position Information of Malfunction Area Performed by UE With reference to FIG. 10 and FIG. 11, the collection operation for collecting the position information of the malfunction area 160 performed by the UE 300 will be described. FIG. 10 is a flowchart illustrating a flow of a collection operation for collecting the position information of the malfunction area 160 performed by the UE 300 in the idle mode, and FIG. 11 is a flowchart illustrating a flow of a collection operation for collecting the position information of the malfunction area 160 performed by the UE 300 in the connected mode.

The UE 300 in the idle mode collects the position information of the malfunction area 160 in accordance with the flow illustrated in FIG. 10. In particular, as illustrated in FIG. 10, the bearer service control unit 333 determines whether or not the power of a received signal transmitted from the eNB 100 meets a predetermined quality (step S101). In other words, the bearer service control unit 333 determines whether or not a reception condition of a signal transmitted from the eNB 100 has worsened.

When it is determined as a result of the determination in step S101 that the power of a received signal transmitted from the eNB 100 meets a predetermined quality (i.e., a reception condition of a signal transmitted from the eNB 100 has not worsened) (step S101: No), the malfunction area geographic position information recording unit 331 sets the value of a variable count to 0 (step S109). After this, the UE 300 in the idle mode may end the operation or may repeat the operations of step S101 and after.

Meanwhile, when it is determined as a result of the determination in step S101 that the power of a received signal transmitted from the eNB 100 does not meet the predetermined quality (i.e., when a reception condition of a signal transmitted from the eNB 100 has worsened) (step S101: Yes), the UE 300 determines that the UE 300 has entered the malfunction area 160. Accordingly, to collect the position information of the malfunction area 160, the malfunction area geographic position information recording unit 331 determines whether the UE 300 is in the malfunction area detection/report state (step S102).

When it is determined as a result of the determination in step S102 that the UE 300 is not in the malfunction area detection/report state (step S102: No), the UE 300 may end the operation or may repeat the operations of step S101 and after.

Meanwhile, when it is determined as a result of the determination in step S102 that the UE 300 is in the malfunction area detection/report state (step S102: Yes), the malfunction area geographic position information recording unit 331 increments the variable count by 1 (step S103).

The malfunction area geographic position information recording unit 331 then determines whether or not the variable count is higher than a predetermined first threshold (step S104). A purpose of the determination in step S104 is to collect the position information of the malfunction area 160 when a situation in which received power does not meet a predetermined quality is detected a predetermined number of times or more in a row (i.e., to prevent the position of the malfunction area 160 from being collected when a situation in which received power does not meet the predetermined quality is unexpectedly detected). In other words, an object of the determination in step S104 is, when a situation in which received power from the eNB 100 does not meet a predetermined quality is not detected a predetermined number of times or more in a row, it is determined that this situation is caused by a mere variation in received power not caused by entering into the malfunction area 160, thereby preventing the position information of the malfunction area 160 from being collected. Accordingly, the first threshold preferably is a value that allows the position information of the malfunction area 160 to be collected in a preferable fashion.

When it is determined as a result of the determination in step S104 that a variable Count is not higher than a predetermined first threshold (step S104: No), the UE 300 may end the operation or may repeat the operations of step S101 and after.

Meanwhile, when it is determined as a result of the determination in step S104 that the variable Count is higher than the predetermined first threshold (step S104: Yes), the malfunction area geographic position information recording unit 331 determines whether or not a hash value stored by the UE 300 is lower than a predetermined second threshold (step S105). A purpose of the determination in step S105 is to collect the position information of the malfunction area 160 a predetermined number of times or more (i.e., to increase the number of samples of the position information of the malfunction area 160). Accordingly, the second threshold preferably is a value that allows the position information of the malfunction area 160 to be collected in a preferable fashion.

When it is determined as a result of the determination in step S105 that the hash value stored by the UE 300 is not lower than the predetermined second threshold (step S105: No), the UE 300 may end the operation or may repeat the operations of step S101 and after.

Meanwhile, when it is determined as a result of the determination in step S105 that the hash value stored by the UE 300 is lower than the predetermined second threshold (step S105: Yes), the malfunction area geographic position information recording unit 331 obtains geographic position information from the GPS position detection unit 312 (step S106). After this, the malfunction area geographic position information recording unit 331 transfers the obtained geographic position information to the place identification information calculation unit 332.

Subsequently, according to a bit data effective range included in a malfunction area position report control IE within an RRC message transmitted from the eNB 100, the place identification information calculation unit 332 extracts effective bit data which is a portion of bit data indicating the geographic position information (step S017).

Next, using a hash calculation key included in a malfunction area position report control IE within the RRC message transmitted from the eNB 100, the place identification information calculation unit 332 performs a hash operation on the effective bit data extracted in step S107 (step S108). As a result, the place identification information calculation unit 332 may calculate a hash value indicating the position of the malfunction area 160 which has been detected. The place identification information calculation unit 332 stores the calculated hash value in, for example, a memory (not illustrated) and increments the number of stored hash values by 1 (step S108).

Meanwhile, the UE 300 in the connected mode collects the position information of the malfunction area 160 in accordance with the flow illustrated in FIG. 11. In particular, as illustrated in FIG. 11, the bearer service control unit 333 determines whether there is a link failure in a connection channel to the eNB 100 (step S111).

When it is determined as a result of the determination in step S111 that there is not a link failure (step S111: No), the UE 300 may end the operation or may repeat the operations of step S111 and after.

Meanwhile, when it is determined as a result of the determination in step S111 that there is a link failure (step S111: Yes), the UE 300 is judged to have entered the malfunction area 160. Accordingly, to collect the position information of the malfunction area 160, the malfunction area geographic position information recording unit 331 obtains geographic position information from the GPS position detection unit 312 (step S112). After this, the malfunction area geographic position information recording unit 331 transfers the obtained geographic position information to the place identification information calculation unit 332. Note that the operation of step S112 is the same as that of step S106 illustrated in FIG. 10.

Subsequently, according to a bit data effective range included in the malfunction area position report control IE within an RRC message transmitted from the eNB 100, the place identification information calculation unit 332 extracts effective bit data which is a portion of bit data indicating the geographic position information (step S113). Note that the operation of step S113 is the same as that of step S107 illustrated in FIG. 10.

Next, using a hash calculation key included in a malfunction area position report control IE within the RRC message transmitted from the eNB 100, the place identification information calculation unit 332 performs a hash operation on the effective bit data extracted in step S113 (step S114). Accordingly, the place identification information calculation unit 332 may calculate a hash value indicating the position of the detected malfunction area 160. In addition, the place identification information calculation unit 332 stores the calculated hash value in, for example, a memory (not illustrated) and increments the number of stored hash values by 1 (step S114). Note that the operation of step S114 is the same as that of step S108 illustrated in FIG. 10.

Figure 12:
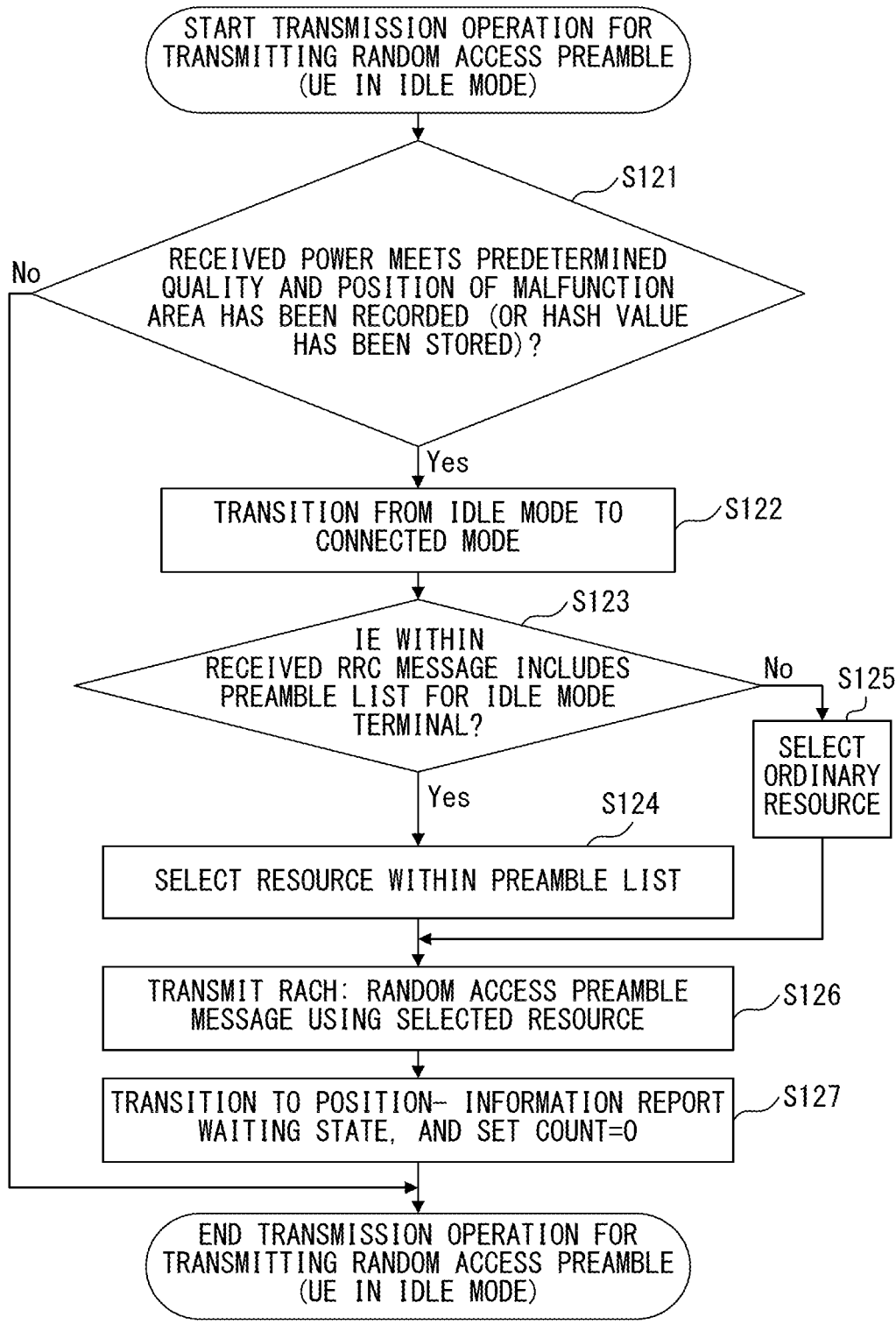
FIG. 12 is a flowchart illustrating a flow of a transmission operation for transmitting a RACH: Random Access Preamble message performed by the UE in the idle mode.
Figure 13:
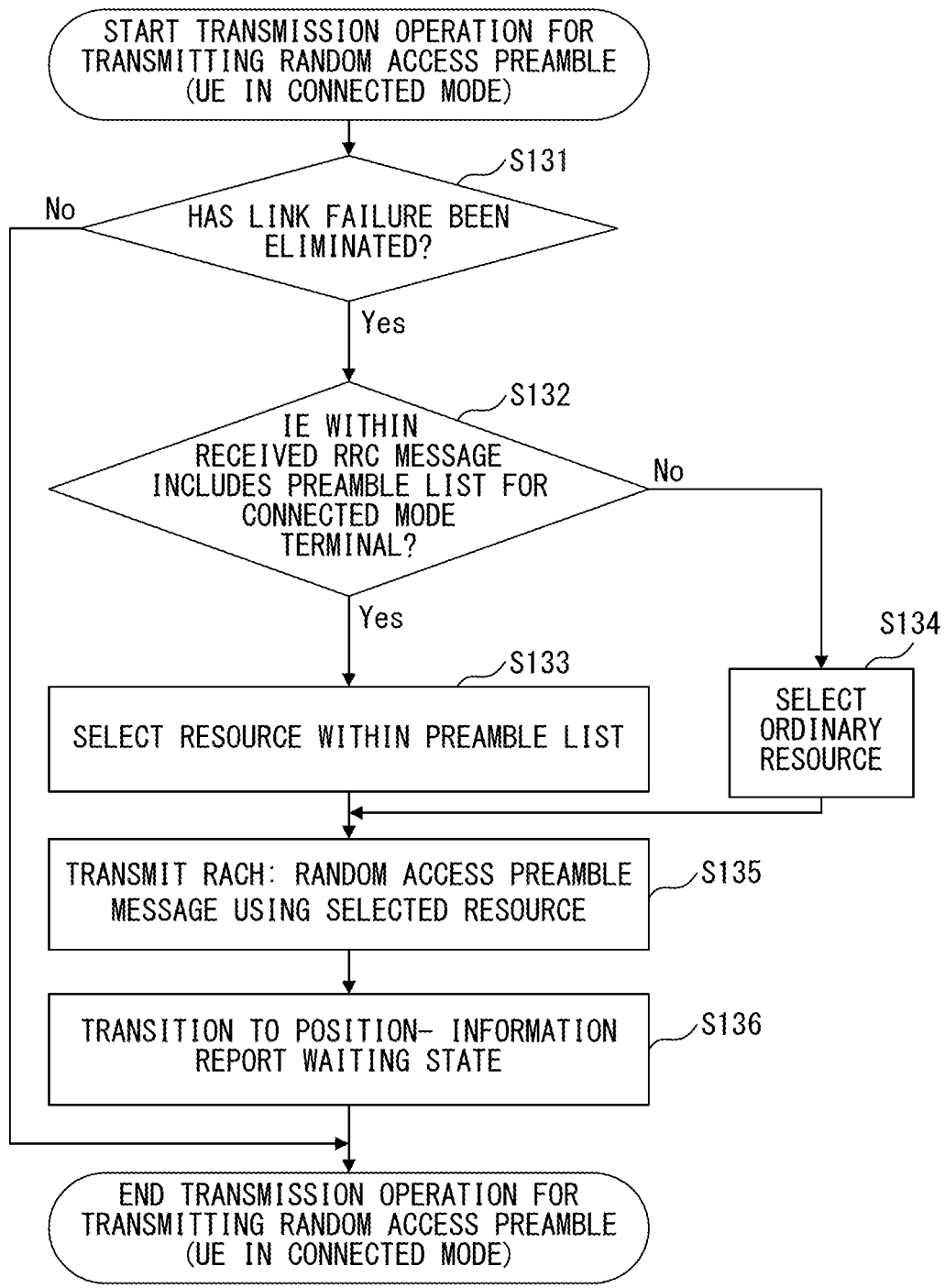
FIG. 13 is a flowchart illustrating a flow of a transmission operation for transmitting the RACH: Random Access Preamble message performed by the UE in the connected mode.

(3-5) Transmission Operation for Transmitting Random Access Preamble Message Performed by UE With reference to FIG. 12 and FIG. 13, a transmission operation for transmitting a RACH: Random Access Preamble message performed by the UE 300 will be described. FIG. 12 is a flowchart illustrating a flow of a transmission operation for transmitting a RACH: Random Access Preamble message performed by the UE 300 in the idle mode, and FIG. 13 is a flowchart illustrating a flow of a transmission operation for transmitting the RACH: Random Access Preamble message performed by the UE 300 in the connected mode.

In accordance with the flow illustrated in FIG. 12, the UE 300 in the idle mode transmits a RACH: Random Access Preamble message to the eNB 100. In particular, as illustrated in FIG. 12, the position information report control and management unit 333 determine whether or not the power of a received signal transmitted from the eNB 100 meets a predetermined quality and the number of stored hash values is one or more (step S121).

When it is determined as a result of the determination in step S121 that the power of a received signal transmitted from the eNB 100 does not meet the predetermined quality (step S121: No), it is assumed that the UE 300 has not yet come out of the malfunction area 160 (i.e., it is still positioned within the malfunction area 160). Accordingly, the UE 300 may end the operation or may repeat the operations of step S121 and after.

Similarly, when it is determined as a result of the determination in step S121 that the number of stored hash values is not one or more (i.e., 0) (step S121: No), it is assumed that the UE 300 has detected no malfunction area 160. Accordingly, since there is no information to be transmitted from the UE 300 to the eNB 100, the UE 300 may end the operation or may repeat the operations of step 121 and after.

Meanwhile, when it is determined as a result of the determination in step S121 that the power of a received signal transmitted from the eNB 100 meets the predetermined quality and the number of stored hash values is one or more (step S121: Yes), it is assumed that the UE 300 has come out of the malfunction area 160. Accordingly, to transmit the position information of the malfunction area 160 to the eNB 100, the bearer service control unit 333 causes the UE 300 to transition from the idle mode to the connected mode (step S122).

Next, the position information report control and management unit 333 determines whether or not a malfunction area position report control IE within the RRC message transmitted from the eNB 100 includes a RACH preamble including a RACH resource to be used by the UE 300 in the idle mode (step S123).

When it is determined as a result of the determination in step S123 that a RACH preamble including a RACH resource to be used by the UE 300 in the idle mode is included (step S123: Yes), the position information report control and management unit 333 selects the RACH resource included in the RACH preamble (step S124).

Meanwhile, when it is determined as a result of the determination in step S123 that a RACH preamble including a RACH resource to be used by the UE 300 in the idle mode is not included (step S123: No), the position information report control and management unit 333 selects an ordinary RACH resource (i.e., a RACH resource designated by conventional notice information) (step S125).

Subsequently, using the RACH resource selected in step S124 or S125, the position information report control and management unit 333 transmits a RACH: Random Access Preamble message to the eNB 100 via the wireless access procedure control unit 335, the communication data processing unit 321, and the wireless network interface unit 311 (step S126).

After this, the position information report control and management unit 333 causes the UE 300 to transition to a position-information report waiting state and sets the variable count to 0 (step S127).

Meanwhile, in accordance with the flow illustrated in FIG. 13, the UE 300 in the connected mode transmits a RACH: Random Access Preamble message to the eNB 100. In particular, as illustrated in FIG. 13, the position information report control and management unit 333 determines whether a link failure that has occurred at a communication channel to the eNB 100 has been recovered (step S131).

When it is determined as a result of the determination in step S131 that the link failure has not been recovered (step S131: No), it is assumed that the UE 300 has not yet come out of the malfunction area 160 (i.e., it is still positioned within the malfunction area 160). Accordingly, the UE 300 may end the operation or may repeat the operations of step S121 and after.

Meanwhile, when it is determined as a result of the determination in step S131 that the link failure has been recovered (step S131: Yes), it is assumed that the UE 300 has come out of the malfunction area 160. Accordingly, to transmit the position information of the malfunction area 160 to the eNB 100, the position information report control and management unit 333 determines whether or not a malfunction area position report control IE within an RRC message transmitted from the eNB 100 includes a RACH preamble including a RACH resource to be used by the UE 300 in the connected mode (step S132).

When it is determined as a result of the determination in step S132 that a RACH preamble including a RACH resource to be used by the UE 300 in the connected mode is included (step S132: Yes), the position information report control and management unit 333 selects the RACH resource included in the RACH preamble (step S133).

Meanwhile, when it is determined as a result of the determination in step S132 that a RACH preamble including a RACH resource to be used by the UE 300 in the idle mode is not included (step S132: No), the position information report control and management unit 333 selects an ordinary RACH resource (i.e., a RACH resource designated by conventional notice information) (step S134).

Subsequently, using the RACH resource selected in step S133 or S134, the position information report control and management unit 333 transmits a RACH: Random Access Preamble message to the eNB 100 via the wireless access procedure control unit 335, the communication data processing unit 321, and the wireless network interface unit 311 (step S135).

After this, the position information report control and management unit 333 causes the UE 300 to transition to the position-information report waiting state (step S136).

(3-6) Reception Operation for Receiving a Random Access Preamble Message Performed by eNB With reference to FIG. 14, a receiving operation for receiving a RACH: Random Access Preamble message performed by the eNB 100 will be described. FIG. 14 is a flowchart illustrating a flow of a reception operation for receiving the RACH: Random Access Preamble message performed by the eNB 100.

As illustrated in FIG. 14, the wireless access procedure control unit 135 determines whether or not reception of a RACH: Random Access Preamble message has been detected (step S141). In other words, the wireless access procedure control unit 135 determines whether or not a RACH: Random Access Preamble message has been transmitted from the UE 300.

When it is determined as a result of the determination in step S141 that reception of a RACH: Random Access Preamble message has not been detected (step S141: No), the eNB 100 may end the operation or may repeat the operations of step S141 and after.

Meanwhile, when it is determined as a result of the determination in step S141 that reception of a RACH: Random Access Preamble message has been detected (step S141: Yes), the position information report control and management unit 133 determines whether or not the eNB 100 is in both a map set-up state and a performance monitoring state (step S142).

When it is determined as a result of the determination in step S142 that the eNB 100 is not in the map set-up state or is not in the performance monitoring state (step S142: No), the wireless access procedure control unit 135 transmits a RACH: Random Access Response message to the UE 300 using an ordinary procedure (step S146). That is, the wireless access procedure control unit 135 transmits a RACH: Random Access Response message to the UE 300 without performing the operations of steps S144 and S145.

Meanwhile, when it is determined as a result of the determination in step S142 that the eNB 100 is in the map set-up state and in the performance monitoring state (step S142: Yes), the position information report control and management unit 133 determines whether or not a dedicated RACH resource used to report the position information of the malfunction area 160 from the UE 300 to the eNB 100 has been designated and the RACH: Random Access Preamble message detected in step S141 has been transmitted using this dedicated RACH resource (step S143).

When it is determined as a result of the determination in step S143 that a dedicated RACH resource has not been designated or that a RACH: Random Access Preamble message has not been transmitted using the dedicated RACH resource (step S143: No), the wireless access procedure control unit 135 transmits a RACH: Random Access Response message to the UE 300 using an ordinary procedure (step S146). That is, the wireless access procedure control unit 135 transmits a RACH: Random Access Response message to the UE 300 without performing the operations of steps S144 and S145.

Meanwhile, when it is determined as a result of the determination in step S143 that a dedicated RACH resource has been designated and/or a RACH: Random Access Preamble message has been transmitted using a dedicated RACH resource (step S143: Yes), the wireless access procedure control unit 135 generates temporary UE identification information to be assigned to the UE 300 that performs a series of RACH procedures (or random access procedures) associated with the RACH: Random Access Preamble message received in step S141 (step S144). As an internal parameter or the like, the position information report control and management unit 133 stores the fact that the UE 300 identified by the generated UE identification information is in the position-information report waiting state (step S144).

When the RACH: Random Access Preamble message received in step S141 is transmitted using a RACH resource to be used by the UE 300 in the idle mode, the position information report control and management unit 133 stores, as an internal parameter or the like, the fact that the UE 300 identified by the UE identification information generated in step S144 is in the idle mode (step S145).

After this, the wireless access procedure control unit 135 transmits a RACH: Random Access Response message to the UE 300 (step S146).

(3-7) Transmission Operation for Transmitting First Scheduled UL Transmission Message Performed by UE With reference to FIG. 15 and FIG. 16, a transmission operation for transmitting a RACH: First scheduled UL transmission message performed by the UE 300 will be described in the following. FIG. 15 is a flowchart illustrating a transmission operation for transmitting a RACH: First scheduled UL transmission message performed by the UE 300, and FIG. 16 is a data structure diagram illustrating a message portion which is a portion of an RRC message, wherein the RRC message is defined by a high-level protocol of the RACH: First scheduled UL transmission message.

As illustrated in FIG. 15, the wireless access procedure control unit 335 determines whether or not reception of a RACH: Random Access Response message has been detected (step S151). In other words, the wireless access procedure control unit 335 determines whether or not a RACH: Random Access Response message has been transmitted from the eNB 100.

When it is determined as a result of the determination in step S151 that reception of a RACH: Random Access Response message has not been detected (step S151: No), the UE 300 may end the operation or may repeat the operations of step S151 and after.

Meanwhile, when it is determined as a result of the determination in step S151 that reception of a RACH: Random Access Response message has been detected (step S151: Yes), the position information report control and management unit 333 determines whether or not the UE 300 is in the position-information report waiting state (step S152).

When it is determined as a result of the determination in step S152 that the UE 300 is not in the position-information report waiting state (step S152: No), the wireless access procedure control unit 335 transmits a RACH: First scheduled UL transmission message to the eNB 100 using an ordinary procedure (step S156). That is, the wireless access procedure control unit 335 transmits a RACH: First scheduled UL transmission message to the eNB 100 without performing the operations of steps S153 to S155 (i.e., without incorporating a hash value indicating the position of the malfunction area 160 into the message).

Meanwhile, when it is determined as a result of the determination in step S152 that the UE 300 is in the position-information report waiting state (step S152: Yes), then, under control of the position information report control and management unit 333, the wireless access procedure control unit 335 incorporates a hash value stored in, for example, a memory (not illustrated) into a RACH: First scheduled UL transmission message and then transmits this message to the eNB 100 (step S153).

As long as the hash value indicating the poison of the malfunction area 160 is incorporated into the RACH: First scheduled UL transmission message, this hash value may be incorporated at any position. As an example, as illustrated in FIG. 16(a), a hash value may be added to the field "criticalExtensions", which is one of the fields for extension within an RRC connection re-establishment message defined by a high level protocol of the RACH: First scheduled UL transmission message. Alternatively, as illustrated in FIG. 16(b), a hash value may be added to the field "criticalExtensions", which is one of the fields for extension within an RRC connection request message defined by a high level protocol of the RACH: First scheduled UL transmission message. Of course, a hash value may be added to another field within the RACH: First scheduled UL transmission message.

Next, the place identification information calculation unit 332 erases a hash value stored in, for example, a memory (not illustrated) and resets the number of stored hash values to 0 (step S154). After this, when the UE 300 is in the idle mode, the bearer service control unit 333 may cause the UE 300 to transition to the idle mode (step S155). Alternatively, when the UE 300 is in the connected mode, the bearer service control unit 333 may restart communication using a communication channel reestablished by recovering a link failure (step S155).

Figure 17:
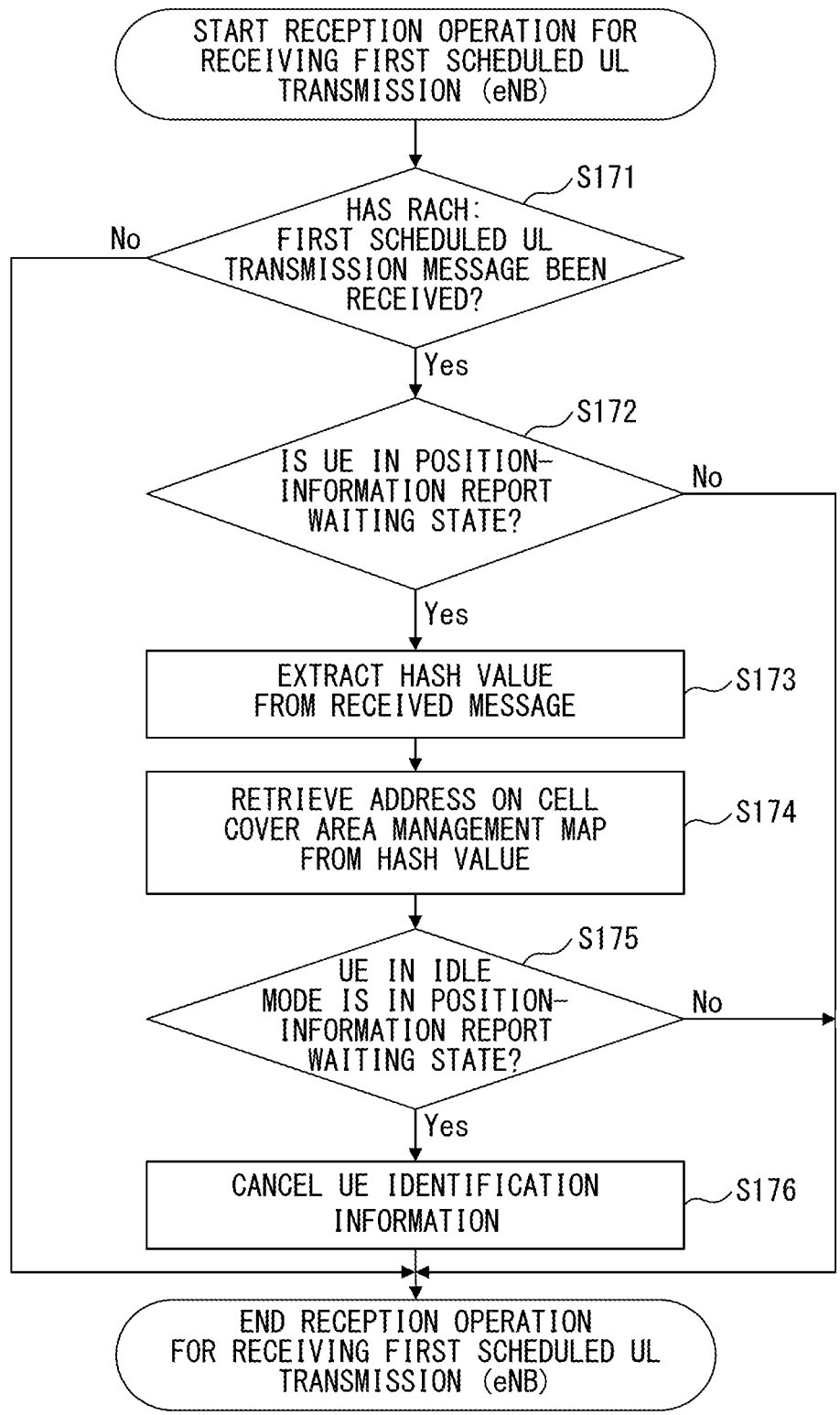
FIG. 17 is a flowchart illustrating a flow of a reception operation for receiving the RACH: First scheduled UL transmission message performed by the eNB.

(3-8) Reception Operation for Receiving First Scheduled UL Transmission Message Performed by eNB With reference to FIG. 17, a reception operation for receiving a RACH: First scheduled UL transmission message performed by the eNB 100 will be described in the following. FIG. 17 is a flowchart illustrating a flow of a reception operation for receiving a RACH: First scheduled UL transmission message performed by the eNB 100.

As illustrated in FIG. 17, the wireless access procedure control unit 135 determines whether or not reception of a RACH: First scheduled UL transmission message has been detected (step S171). In other words, the wireless access procedure control unit 135 determines whether or not a RACH: First scheduled UL transmission message has been transmitted from the UE 300.

When it is determined as a result of the determination in step S171 that reception of a RACH: First scheduled UL transmission message has not been detected (step S171: No), the eNB 100 may end the operation or may repeat the operations of step S171 and after.

Meanwhile, when it is determined as a result of the determination in step S171 that reception of a RACH: First scheduled UL transmission message has been detected (step S171: Yes), the position information report control and management unit 133 determines whether or not the UE 300, which has received this message, is in the position-information report waiting state (step S172).

When it is determined as a result of the determination in step S172 that the UE 300 is not in the position-information report waiting state (step S172: No), the wireless access procedure control unit 135 transmits a RACH: Contention Resolutions message to the UE 300 using an ordinary procedure and ends the operation.

Meanwhile, when it is determined as a result of the determination in step S172 that the UE 300 is in the position-information report waiting state (step S172: Yes), the position information report control and management unit 133 extracts a hash value included in the received RACH: First scheduled UL transmission message (step S173). The position information report control unit 133 then transfers the extracted hash value to the malfunction area identification unit 131.

Subsequently, the malfunction area identification unit 131 retrieves a grid ID corresponding to the extracted hash value (step S174). As a result, a grid identified by the retrieved grid ID (i.e., an area portion corresponding to this grid) is managed as the malfunction area 160 by the eNB 100.

Next, the position information report control and management unit 133 determines whether or not the UE 300 which has transmitted the RACH: First scheduled UL transmission message is in the idle mode (step S175).

When it is determined as a result of the determination in step S175 that the UE 300 which has transmitted the RACH: First scheduled UL transmission message is not in the idle mode (step S175: No), the wireless access procedure control unit 135 may transmit as appropriate a RACH: Contention Resolutions message to the UE 300 and may end the operation or restart wireless communication with the UE 300.

Meanwhile, when it is determined as a result of the determination in step S175 that the UE 300 which has transmitted the RACH: First scheduled UL transmission message is in the idle mode (step S175: Yes), the position information report control and management unit 133 releases temporary UE identification information assigned to the UE 300 (see step S144 in FIG. 14) (step S176). In this case, the wireless access procedure control unit 135 may transmit a RACH: Contention Resolutions message to the UE 300 as appropriate. After this, the eNB 100 ends the operation.

As described above, according to the wireless communication system 1 in accordance with the present embodiment, the position information of the malfunction area 160 may be transmitted from the UE 300 to the eNB 100 using a random access procedure, an initial procedure that is executed to establish a communication channel between the UE 300 and the eNB 100 (i.e., an initial procedure using a RACH). In other words, the transmitting operation for transmitting the position information of the malfunction area 160 from the UE 300 to the eNB 100 may be completed within the random access procedure. Accordingly, it is not needed to report the position information of the malfunction area 160 from the UE 300 to a location service node such as an E-SMLC or the like and to then report this position information from this location service node to each eNB 100. It is thus possible to prevent the position information of the malfunction area 160 from being reported concentratedly to the location service node in a preferable manner. As a result, a processing load on the wireless communication system 1 may be made relatively small.

Moreover, according to the wireless communication system 1 in accordance with the present embodiment, a hash value may be calculated from effective bit data from among bit data indicating geographic position information indicative of the position of the malfunction area 160. Accordingly, in comparison with an aspect in which a hash value is calculated from all bit data, the amount of data used to report the position of the malfunction area 160 may be decreased.

Meanwhile, according to the wireless communication system 1 in accordance with the present embodiment, a hash calculation key used to calculate a hash value is reported in advance from the eNB 100 to the UE 300. Accordingly, the UE 300 may calculate a hash value from geographic position information indicative of the position of the detected malfunction area 160 in a preferable manner.

In addition, using a secure procedure after authentication of the UE 300 (e.g., an RRC message), a hash calculation key is reported in advance from the eNB 100 to the UE 300. As a result, a malicious UE 300 cannot obtain a hash calculation key. Accordingly, it is possible to prevent the eNB 100 from treating an invalid hash value transmitted by a malicious UE 300 as a valid hash value.

According to the wireless communication system 1 in accordance with the present embodiment, information to identify effective bit data is reported in advance from the eNB 100 to the UE 300. Accordingly, the UE 300 may extract effective bit data from among bit data indicating geographic position information data indicative of the position of the detected malfunction area 160 in a preferable manner and may calculate a hash value from the extracted bit data in a preferable manner.

According to the wireless communication system 1 in accordance with the present embodiment, when the position information of the malfunction area 160 is reported, a RACH: Random Access preamble message may be transmitted using a dedicated RACH resource. Accordingly, transmission of an ordinary RACH: Random Access Preamble message may be distinguished from a RACH: Random Access Preamble message for reporting the position of the malfunction area 160. As a result, it is possible to prevent operations relating to reporting of the position of the malfunction area 160 from adversely affecting ordinary communication operations involving transmission of an ordinary RACH: Random Access Preamble message in a preferable manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A method comprising:
collecting position information indicating a position of an area to which a wireless communication service is not provided, the collecting being performed by a mobile terminal, the position information including transformed information whose information amount is smaller than an information amount of geographic position information directly indicating the position of the area with latitude and longitude and which is obtained by transforming, in accordance with a predetermined transformation, bit data that remains after a portion of bit data of the geographic position information is deleted;
adding the position information to a request for setting up a communication channel between a wireless base station and the mobile station using a random access procedure;
transmitting the request from the mobile terminal to the wireless base station; and
identifying the area which is within a cell range of the wireless base station and to which the wireless communication service is not provided, the identifying being performed by the wireless base station.

2. The method according to claim 1, wherein
the position information includes transformed information which is obtained by transforming geographic position information in accordance with a predetermined transformation and whose information amount is smaller than an information amount of the geographic position information, and the geographic position information is information directly indicating the position of the area with latitude and longitude.

3. The method according to claim 2, further comprising
reporting the predetermined transformation from the wireless base station to the mobile terminal, wherein
the collecting collects the position information by transforming the geographic position information into the transformed information with the predetermined transformation reported by the reporting.

4. The method according to claim 1, further comprising
reporting deletion information identifying the predetermined transformation and the deleted portion of bit data from the wireless base station to the mobile terminal, wherein
the collecting deletes the portion of bit data by using the deletion information reported by the reporting, and collects the position information by transforming, into the transformed information, bit data included in the geographic position information by using the transformation reported by the reporting.

5. The method according to claim 1, further comprising
determining whether or not a prescribed number of the position information has been collected, wherein
the transmitting transmits the request including the position information when the prescribed number of the position information has been collected.

6. A wireless base station comprising:
reception unit to receive a request including position information, the request being for setting up a communication channel between the wireless base station and a mobile terminal using a random access procedure, the position information being transmitted from the mobile terminal and identifying a position of an area which is within a cell range of the wireless base station and to which a wireless communication service is not provided, the position information including transformed information whose information amount is smaller than an information amount of geographic position information directly indicating the position of the area with latitude and longitude and which is obtained by transforming, in accordance with a predetermined transformation, bit data that remains after a portion of bit data of the geographic position information is deleted; and identification unit to identify the position of the area in accordance with the position information received by the reception unit.

7. A mobile terminal comprising:

collection unit to collect position information identifying a position of an area which is within a cell range of a wireless base station and to which a wireless communication service is not provided, the position information including transformed information whose information amount is smaller than an information amount of geographic position information directly indicating the position of the area with latitude and longitude and which is obtained by transforming, in accordance with a predetermined transformation, bit data that remains after a portion of bit data of the geographic position information is deleted;

adding unit to add the position information to a request for setting up a communication channel between the wireless base station and the mobile terminal using a random access procedure; and transmission unit to transmit the request to the wireless base station.

8. The mobile terminal according to claim 7, further comprising a determining unit to determine whether or not a prescribed number of the position information has been collected, wherein the transmission unit transmits the request including the position information when the prescribed number of the position information has been collected.

9. A wireless communication system comprising:

a mobile terminal; and a wireless base station; wherein the mobile terminal collects position information identifying a position of an area which is within a cell range of the wireless base station and to which a wireless communication service is not provided, the position information including transformed information whose information amount is smaller than an information amount of geographic position information directly indicating the position of the area with latitude and longitude and which is obtained by transforming, in accordance with a predetermined transformation, bit data that remains after a portion of bit data of the geographic position information is deleted, adds the position information to a request for setting up a communication channel between the wireless base station and the mobile terminal using a random access procedure, and transmits the request to the wireless base station, and the wireless base station receives the request including the position information transmitted from the mobile terminal by using the random access procedure, and identifies the position of the area in accordance with the position information received by the reception means.

10. The wireless communication system according to claim 9, wherein the mobile terminal determines whether or not a prescribed number of position information has been collected, and transmits the request including the position information when the prescribed number of the position information has been collected.

* * * * *